(12) United States Patent
Okita et al.

(10) Patent No.: US 10,094,267 B2
(45) Date of Patent: Oct. 9, 2018

(54) COOLING WATER FLOW CONTROL FOR A SADDLE-RIDDEN TYPE VEHICLE

(71) Applicant: SUZUKI MOTOR CORPORATION, Hamamatsu-shi, Shizuoka (JP)

(72) Inventors: Kazuhiro Okita, Hamamatsu (JP); Takaya Suzuki, Hamamatsu (JP); Shintaro Yagi, Hamamatsu (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 208 days.

(21) Appl. No.: 15/299,019

(22) Filed: Oct. 20, 2016

(65) Prior Publication Data
US 2017/0114702 A1 Apr. 27, 2017

(30) Foreign Application Priority Data
Oct. 27, 2015 (JP) .................. 2015-210456

(51) Int. Cl.
| F01P 7/16 | (2006.01) |
| F01P 3/12 | (2006.01) |
| F01P 3/18 | (2006.01) |
| F02B 61/02 | (2006.01) |
| F01P 11/04 | (2006.01) |

(Continued)

(52) U.S. Cl.
CPC .................. F01P 7/16 (2013.01); F01P 3/12 (2013.01); F01P 3/18 (2013.01); F01P 7/165 (2013.01); F01P 7/167 (2013.01); F01P 11/04 (2013.01); F02B 61/02 (2013.01); *B62M 7/02* (2013.01); *F01P 2003/001* (2013.01); *F01P 2050/16* (2013.01); *F01P 2060/02* (2013.01)

(58) Field of Classification Search
CPC .... F01P 7/16; F01P 7/165; F01P 7/167; F01P 3/12; F01P 3/18; F01P 11/04; F01P 2003/001; F01P 2060/02; F01P 2060/04; F01P 2050/16; F02B 61/02
See application file for complete search history.

(56) References Cited

U.S. PATENT DOCUMENTS

| 5,103,774 A * | 4/1992 | Hirata ...................... F01P 5/10 123/41.1 |
| 6,523,506 B2 * | 2/2003 | Hirano ...................... F01P 7/16 123/41.1 |

(Continued)

FOREIGN PATENT DOCUMENTS

JP 2007-85264 A 4/2007

*Primary Examiner* — Grant Moubry
(74) *Attorney, Agent, or Firm* — Stein IP, LLC

(57) ABSTRACT

There is provided a saddle-ridden type vehicle including an engine, a water pump, and a radiator. A cooling water flow control unit switches a first circulation path without flowing in the radiator, and a second circulation path through the radiator, in accordance with a temperature of cooling water. The cooling water flow control unit includes a thermostat and a thermostat housing. The thermostat housing is formed with a first passage, a second passage disposed adjacent to the first passage, and a bypass passage communicating the first passage and the second passage. The thermostat switches communication and cutoff of the second passage at a part of the second passage, which is positioned upstream of a connection part between the second passage and the bypass passage, in accordance with the temperature of the cooling water.

8 Claims, 12 Drawing Sheets

(51) Int. Cl.
*F01P 3/00* (2006.01)
*B62M 7/02* (2006.01)

(56) References Cited

U.S. PATENT DOCUMENTS

| | | | |
|---|---|---|---|
| 6,702,054 B2* | 3/2004 | Schneider | B62M 7/00 |
| | | | 123/41.29 |
| 7,172,135 B2* | 2/2007 | Masuko | F01P 7/16 |
| | | | 123/41.08 |
| 8,109,242 B2* | 2/2012 | Deivasigamani | G05D 23/134 |
| | | | 123/41.1 |
| 9,266,421 B2* | 2/2016 | Sugiura | B60K 11/02 |
| 9,285,049 B2* | 3/2016 | Yajima | F16K 27/02 |
| 9,453,455 B2* | 9/2016 | Lewis | F01P 7/16 |
| 2010/0326375 A1* | 12/2010 | Furukoshi | F01P 7/16 |
| | | | 123/41.09 |

* cited by examiner

COOLING WATER FLOW CONTROL FOR A SADDLE-RIDDEN TYPE VEHICLE

CROSS-REFERENCE TO RELATED APPLICATIONS

The disclosure of Japanese Patent Application No. 2015-210456 filed on Oct. 27, 2015, including specification, drawings and claims is incorporated herein by reference in its entirety.

TECHNICAL FIELD

The disclosure relates to a saddle-ridden type vehicle having an engine and a water-cooling type cooling device configured to cool the engine.

BACKGROUND

A saddle-ridden type vehicle such as a motorcycle has an engine and a cooling device configured to cool the engine. When the engine is a water-cooling type engine, the saddle-ridden type vehicle is provided with a variety of components, as cooling system components configuring the cooling device, as follows.

That is, the saddle-ridden type vehicle is provided with a water pump configured to discharge cooling water, a water jacket configured to flow the cooling water around a cylinder and a cylinder head of the engine and to thereby cool the cylinder and the cylinder head, and a radiator configured to cool the cooling water, of which temperature has increased resulting from the cooling of the cylinder and the cylinder head, by traveling wind. In addition, the saddle-ridden type vehicle is provided with a thermostat configured to switch a circulation path of the cooling water, which is to be discharged from the water pump, to flow in the water jacket and then to return to the water pump without flowing in the radiator, and a circulation path of the cooling water, which is to be discharged from the water pump, to flow in the water jacket and the radiator and then to return to the water pump.

Also, in order to form the two circulation paths, a piping configured to supply the cooling water from the water pump to the water jacket is provided between a discharge port of the water pump and an inlet of the water jacket, a piping configured to deliver the cooling water from the water jacket to the radiator is provided between an outlet of the water jacket and an inlet of the radiator, and a piping configured to return the cooling water from the radiator to the water pump is provided between an outlet of the radiator and an intake port of the water pump. In addition, a bypass piping configured to return the cooling water from the water jacket to the water pump without flowing the cooling water in the radiator is provided between the outlet of the water jacket and the intake port of the water pump.

For example, in a motorcycle disclosed in Patent Document 1, the above-described cooling system components are disposed as follows. That is, when describing front, rear, right, left, upper and lower directions on the basis of a driver sitting on a seat of the motorcycle, the water pump is attached to a rear-lower part of a left side of the engine, as shown in FIGS. 2 to 5 of Patent Document 1. Also, the cooling water inlet of the water jacket is disposed at a front part of the engine, and the cooling water outlet is disposed at a rear part of the engine. Also, the radiator is disposed at the front of the engine, and the cooling water inlet of the radiator is disposed at a right part of the radiator and the cooling water outlet is disposed at a left part of the radiator.

Also, the radiator adapted for the motorcycle is a so-called transverse flow type. The cooling water is enabled to flow in a right-left direction (in the example, from right to left) in the radiator and is thus cooled. Also, the thermostat is disposed at the rear part of the engine, and is directly connected to the cooling water outlet of the water jacket.

Also, in the motorcycle disclosed in Patent Document 1, the piping (cylinder inlet hose) configured to connect the discharge port of the water pump and the inlet of the water jacket extends over a range from the rear-lower part of the left side of the engine to the front part of the engine. Also, the piping (radiator inlet hose) configured to connect the thermostat directly connected to the outlet of the water jacket and the inlet of the radiator extends from the rear part of the engine toward the front of the engine through the right side of the engine. Also, the piping (radiator outlet hose) configured to connect the outlet of the radiator and the intake port of the water pump extends from the left part of the radiator toward the rear-lower part of the left side of the engine. Also, the left part of the radiator is formed with a separate inlet above the cooling water outlet, and the separate inlet is in communication with the outlet of the radiator without interposing a radiator core. Also, the piping (bypass hose) is connected between the inlet and the thermostat directly connected to the outlet of the water jacket, and extends from the rear part of the engine toward the front of the engine through the left side of the engine.

Patent Document 1: Japanese Patent Application Publication No. 2007-85264A

In the saddle-ridden type vehicle of the related art, like the motorcycle disclosed in Patent Document 1, the plurality of pipings for flowing the cooling water among the water pump, the water jacket and the radiator is dispersedly disposed around the engine. For this reason, following problems are caused.

That is, the engine should be provided with a variety of components, such as components relating to air intake and air exhaust of the engine, components relating to lubrication of respective parts in the engine, and components relating to power generation and electric control, in addition to the cooling system components. However, when the plurality of pipings for flowing the cooling water is dispersedly disposed around the engine, places at which the components are to be provided are considerably limited. For this reason, it is difficult to secure a space in which the engine is provided with the components.

Also, when the plurality of pipings for flowing the cooling water is dispersedly disposed around the engine, each piping is lengthened, so that a pressure loss of the cooling water flowing along the piping increases.

The plurality of pipings for flowing the cooling water is dispersedly disposed around the engine, so that the above problems are caused. However, it is not easy to concentrate the plurality of pipings for flowing the cooling water due to following situations.

That is, since the water pump is configured to rotate the pump by using rotation of a crankshaft, it is attached to a side of the engine due to a structure of transmitting rotation power of the crankshaft to the pump, in many cases. Also, for an engine having a plurality of cylinders disposed in parallel, in order to make a flow of the cooling water, which does not cause non-uniformity of a cooling effect, for each cylinder, the outlet of the water jacket is disposed at an intermediate part, in the right-left direction, of the rear part of the engine, in many cases. Also, in the radiator, particularly, in the transverse flow type radiator, the inlet of the cooling water and the outlet of the cooling water are spaced from each other in the right-left direction due to a structure of circulating the cooling water in the right-left direction. In this way, since the water pump, the outlet of the water jacket, the inlet and the outlet of the radiator and the like are dispersedly disposed around the engine, it is not easy to concentrate the pipings configured to connect the same.

SUMMARY

The disclosure has been made in view of the above situations, and a first object of the disclosure is to provide a saddle-ridden type vehicle capable of easing limits on places of an engine at which the engine is provided with respective components and easily securing a space in which the engine is provided with respective components.

Also, a second object of the disclosure is to provide a saddle-ridden type vehicle capable of reducing a pressure loss of cooling water flowing along a piping.

According to an aspect of the embodiments of the present invention, there is provided a saddle-ridden type vehicle comprising: an engine; a water pump configured to supply cooling water for cooling the engine to the engine; a radiator configured to cool the cooling water having cooled the engine; and a cooling water flow control unit configured to switch a first circulation path of the cooling water, which is to be discharged from the water pump, to flow in the engine and to return to the water pump without flowing in the radiator, and a second circulation path of the cooling water, which is to be discharged from the water pump, to flow in the engine and to return to the water pump while at least a part of the cooling water flows in the radiator, in accordance with a temperature of the cooling water, wherein the cooling water flow control unit comprises a thermostat and a thermostat housing configured to accommodate therein the thermostat, wherein the thermostat housing is formed with a first passage into which the cooling water flowing out from the engine after cooling the engine is to be introduced and which is configured to deliver the introduced cooling water to the radiator, a second passage into which the cooling water flowing out from the radiator after being cooled by the radiator is to be introduced and which is configured to return the introduced cooling water to the water pump, and a bypass passage configured to communicate the first passage and the second passage each other, the first passage and the second passage being disposed to be adjacent to each other, and wherein the thermostat is configured to switch communication and cutoff of the second passage at a part of the second passage, which is positioned upstream of a connection part between the second passage and the bypass passage, in accordance with the temperature of the cooling water.

In the above aspect of the disclosure, in order to form the first circulation path and the second circulation path, the cooling water flow control unit is connected with a piping for introducing the cooling water flowing out from the engine after cooling the engine into the first passage, a piping for introducing the cooling water flowing out from the first passage into the radiator, a piping for introducing the cooling water flowing out from the radiator after being cooled by the radiator into the second passage, and a piping for introducing the cooling water flowing out from the second passage into an intake port of the water pump. In this way, according to the above aspect of the disclosure, all of the four pipings for forming the first circulation path and the second circulation path are connected by the single cooling water flow control unit, so that it is possible to concentrate the four pipings about the cooling water flow control unit.

Also, since the first passage and the second passage are adjacent to each other in the cooling water flow control unit, the two pipings to be connected to the inlet-side and the outlet-side of the first passage and the two pipings to be connected to the inlet-side and the outlet-side of the second passage are disposed close to each other at least in the vicinity of the cooling water flow control unit. Thereby, it is possible to increase a degree of the concentrated arrangement of the four pipings. As a result, since a region in which a piping of a cooling system is not to be disposed increases around the engine, it is possible to dispose respective components to be provided in the engine, for example, respective components of an intake system, an exhaust system, a lubrication system or an electric control system of the engine in the corresponding region and to easily select arrangement parts of the respective components.

Also, the bypass passage configured to communicate the first passage and the second passage each other in the cooling water flow control unit becomes a passage configuring a part of the first circulation path. According to the above aspect of the disclosure, since the bypass passage is formed at the thermostat housing of the cooling water flow control unit, a piping for forming the bypass passage is not required. Therefore, it is possible to increase the number of pipings of the cooling system and to increase regions in which a piping of the cooling system is not to be disposed around the engine. As a result, it is possible to easily secure spaces in which the respective components relating to the intake system, the exhaust system, the lubrication system or the electric control system are to be disposed. Also, the number of the pipings configuring the first circulation path is reduced to shorten the first circulation path, so that it is possible to reduce a pressure loss of the cooling water flowing along the first circulation path. Also, the bypass passage is formed between the first passage and the second passage adjacent to each other, so that it is possible to shorten the bypass passage. Thereby, it is possible to reduce the pressure loss of the cooling water flowing along the bypass passage.

In the saddle-ridden type vehicle, the first passage and the second passage may be disposed in parallel with each other.

According to the above aspect of the disclosure, parts of the two pipings to be respectively connected to the inlet-side and the outlet-side of the first passage, which are positioned at least in the vicinity of the cooling water flow control unit, and parts of the two pipings to be respectively connected to the inlet-side and the outlet-side of the second passage, which are positioned at least in the vicinity of the cooling water flow control unit, can be disposed in parallel with each other. Thereby, it is possible to further increase the degree of concentrated arrangement of the four pipings of the cooling system.

In the saddle-ridden type vehicle, the thermostat may comprise a valve seat, a valve body and a thermoelement configured to move the valve body in a predetermined moving direction and to enable the valve body to be separated from or to be seated on the valve seat in accordance with the temperature of the cooling water, and the thermostat may be disposed in the thermostat housing so that the moving direction of the valve body perpendicularly intersects with the first passage and the second passage.

According to the above aspect of the disclosure, it is possible to effectively dispose the first passage, the second passage and the thermostat, so that it is possible to miniaturize the cooling water flow control unit. Also, it is possible to easily form a configuration of guiding the cooling water to flow in the bypass passage to the thermoelement and a configuration of disposing the valve seat and the valve body at the part of the second passage, which is positioned upstream of a connection part between the second passage and the bypass passage, and communicating and cutting off the part of the second passage.

In the saddle-ridden type vehicle, one side of the thermostat housing may be formed with, as the first passage, a first chamber, an inlet for introducing the cooling water having flowed out from the engine into the first chamber and a delivery port for delivering the cooling water introduced into the first chamber to the radiator, the other side of the thermostat housing may be formed with, as the second passage, a second chamber, a return port for introducing the cooling water having flowed out from the radiator into the second chamber and an outlet for returning the cooling water introduced into the second chamber to the water pump, the thermostat housing may be formed therein with, as the bypass passage, a hole for communicating the first chamber and the second chamber each other, and the thermostat may be disposed in the second chamber.

In the cooling water flow control unit of the above aspect of the disclosure, the inlet is connected with the piping for introducing the cooling water flowing out from the engine after cooling the engine into the first chamber, and the delivery port is connected with the piping for introducing the cooling water delivered from the first chamber into the radiator. Also, the return port is connected with the piping for introducing the cooling water flowing out from the radiator after being cooled by the radiator into the second chamber, and the outlet is connected with the piping for introducing the cooling water flowing out from the second chamber into the intake port of the water pump. In this way, it is possible to concentrate the four pipings of the cooling system in the single cooling water flow control unit.

In the saddle-ridden type vehicle, in the thermostat housing, an opening direction of the inlet and an opening direction of the outlet may be the same and an opening direction of the delivery port and an opening direction of the return port may be the same.

According to the above aspect of the disclosure, parts of the two pipings connected to the inlet and the outlet, which are positioned at least in the vicinity of the cooling water flow control unit, are parallel with each other. Also, parts of the two pipings connected to the delivery port and the return port, which are positioned at least in the vicinity of the cooling water flow control unit, are parallel with each other. Thereby, it is possible to easily concentrate the four pipings of the cooling system.

In the saddle-ridden type vehicle, the thermostat housing may be formed with a third passage for introducing the cooling water having flowed in a supercharger or an oil cooler attached to the engine into the first passage.

In the above aspect of the disclosure, when the engine is provided with the supercharger or the water-cooling type oil cooler and is formed with a path in which the cooling water is supplied from the water pump to the supercharger or the oil cooler and the cooling water flowing out from the supercharger or the oil cooler after cooling the supercharger or the engine oil is returned to the water pump, the cooling water flowing out from the supercharger or the oil cooler is introduced into the third path. In this case, the piping for flowing the cooling water flowed out from the supercharger or the oil cooler is connected to the inlet-side of the third path. Thereby, the piping for flowing the cooling water flowed out from the supercharger or the oil cooler can be concentrated about the single cooling water flow control unit together with the four pipings, i.e., the piping for introducing the cooling water flowing out from the engine after cooling the engine into the first passage, the piping for introducing the cooling water delivered from the first passage into the radiator, the piping for introducing the cooling water flowing out from the radiator after being cooled by the radiator into the second passage and the piping for introducing the cooling water flowing out from the second passage into the intake port of the water pump.

In the saddle-ridden type vehicle, when defining front, rear, right, left, upper and lower directions on the basis of a driver sitting on a seat of the saddle-ridden type vehicle, a supercharger may be disposed at the front of the engine and at one side of the engine in a right-left direction, an intercooler may be disposed above the engine, a piping configured to connect the supercharger and the intercooler and to guide air compressed by the supercharger to the intercooler may be disposed at the front of the engine, the cooling water flow control unit may be disposed above the engine, below the intercooler and at the other side of the engine in the right-left direction so that the first passage is at the one side in the right-left direction and the second passage is at the other side in the right-left direction, and the piping may be configured to pass through one side of the cooling water flow control unit in the right-left direction.

According to the above aspect of the disclosure, it is possible to dispose the second passage of the cooling water flow control unit and the piping configured to guide air compressed by the supercharger into the intercooler with being spaced from each other. Thereby, the two pipings of the cooling system connected to the inlet-side and the outlet-side of the second passage of the cooling water flow control unit, i.e., the piping for introducing the cooling water flowing out from the radiator after being cooled by the radiator into the second passage and the piping for introducing the cooling water flowing out from the second passage into the intake port of the water pump can be spaced from the piping for guiding the air compressed by the supercharger into the intercooler. Therefore, it is possible to suppress a situation where heat of the air of which temperature has increased resulting from the compression by the supercharger is transmitted to the cooling water flowing along the two pipings of the cooling system after being cooled, so that it is possible to suppress the cooling water from being heated by the heat of the air.

In the saddle-ridden type vehicle, the second passage may be located at a position spaced from the supercharger relative to the first passage.

According to the above aspect of the disclosure, it is possible to suppress the cooling water flowing along the two pipings connected to the inlet-side and the outlet-side of the second passage of the cooling water flow control unit from being heated by the heat to be generated from the supercharger.

According to the disclosure, it is possible to ease limits on the places of the engine at which the engine should be provided with the respective components, so that it is possible to easily secure a space in which the engine is provided with the respective components. Also, it is possible to reduce a pressure loss of the cooling water flowing along the piping.

DETAILED DESCRIPTION OF THE EMBODIMENTS (Motorcycle Having Supercharger)

Figure 1:
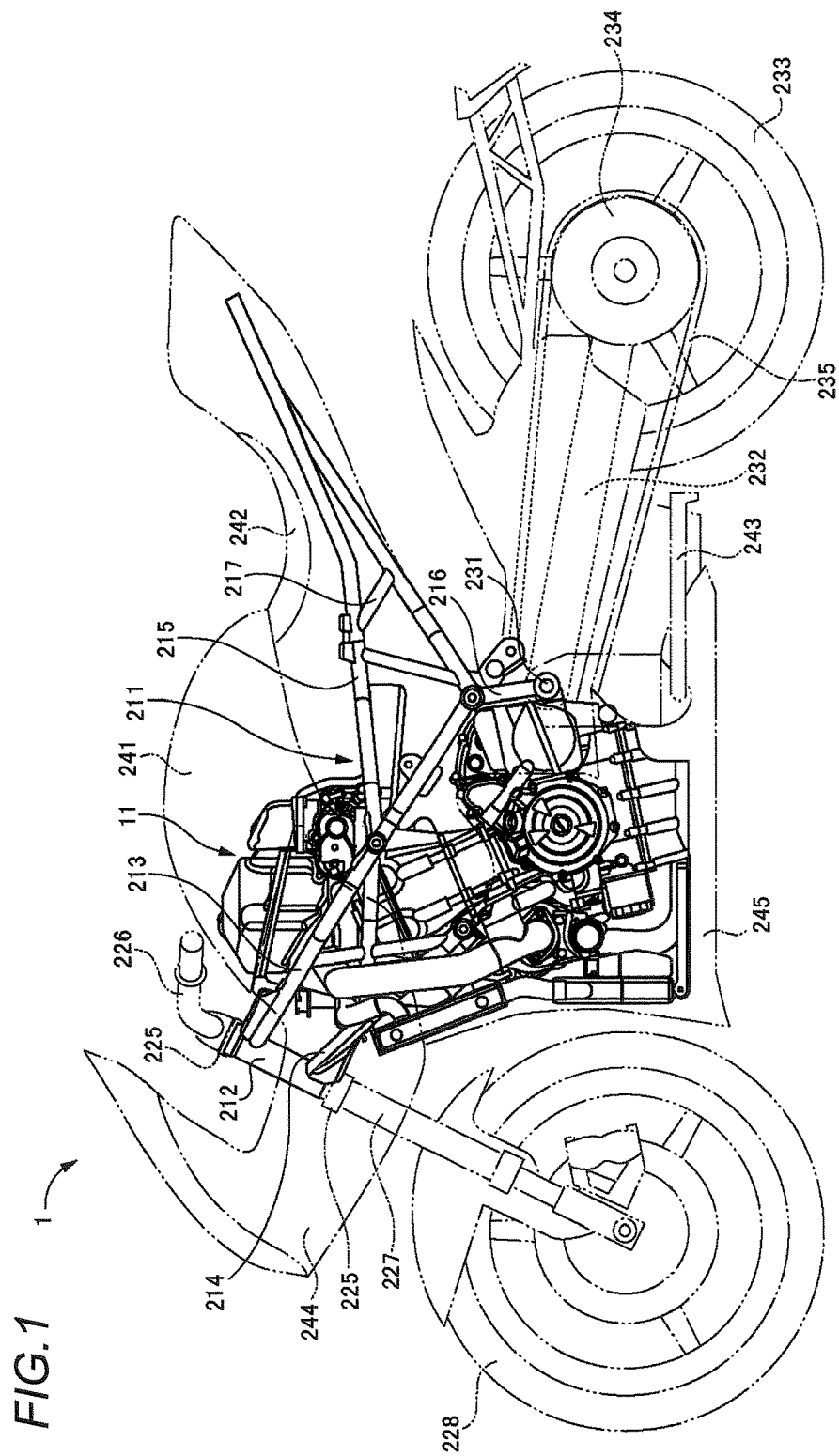
FIG. 1 illustrates a motorcycle having a supercharger, which is an illustrative embodiment of the saddle-ridden type vehicle of the disclosure.

FIG. 1 illustrates a motorcycle having a supercharger, which is an illustrative embodiment of the saddle-ridden type vehicle of the disclosure. In FIG. 1, parts except for a vehicle body frame and an engine unit of the motorcycle having the supercharger are shown with a dashed-two dotted line for convenience of explanations. Also, in below descriptions of the illustrative embodiment, front, rear, right, left, upper and lower directions are described on the basis of a driver who sits on a seat of the motorcycle having the supercharger.

In FIG. 1, a vehicle body frame 211 of a motorcycle 1 having a supercharger, which is an illustrative embodiment of the saddle-ridden type vehicle of the disclosure, is formed by joining a plurality of steel pipes, for example. Specifically, the vehicle body frame 211 has a head pipe 212 disposed at a front-upper side of the motorcycle 1, a pair of main frames 213 each of which is disposed at right and left sides of the motorcycle 1, respectively, and has a front end portion connected to an upper part of the head pipe 212 and a rear end-side extending rearward with being inclined downward, a pair of down tubes 214 each of which is disposed at the right and left sides of the motorcycle 1, respectively, and has a front end portion connected to a lower part of the head pipe 212 and a rear end-side extending rearward with being inclined downward beyond the main frame 213, a pair of side frames 215 each of which is disposed at the right and left sides of the motorcycle 1, respectively, and has a front end portion connected to an intermediate part of the down tube 214 and a rear end-side extending rearward, and a pair of pivot frames 216 joined to the rear end-sides of the main frames 213. Also, a reinforcement frame 217 is provided among the main frame 213, the down tube 214 and the side frame 215.

Also, a steering shaft (not shown) is inserted into the head pipe 212, and upper and lower end portions of the steering shaft are respectively provided with steering brackets 225. The upper steering bracket 225 is provided with a handlebar 226. A pair of right and left front forks 227 is supported at upper parts thereof to the upper and lower steering brackets 225, and a front wheel 228 is supported to lower ends of the front forks 227.

Also, a front end-side of a swing arm 232 is supported between the pair of right and left pivot frames 216 via a pivot shaft 231, and a rear wheel 233 is supported to a rear end-side of the swing arm 232. Also, an axle of the rear wheel 233 is provided with a driven sprocket 234, and a chain 235 configured to transmit power of an engine 12 (which will be described later) is wound on the driven sprocket 234.

Also, an engine unit 11 is provided between the front wheel 228 and the rear wheel 233 of the motorcycle 1. The engine unit 11 is mainly disposed between the left main frame 213 and left down tube 214 and the right main frame 213 and right down tube 214 and is supported to the corresponding frames. Also, a fuel tank 241 is, provided above the engine unit 11, and a seat 242 is provided at the rear of the fuel tank 241. Also, a side stand 243 is provided at the left side of the motorcycle 1 and at a lower-rear part of the engine unit 11. Also, an upper cowl 244 is provided at a front-upper side of the motorcycle 1. Also, the motorcycle 1 is provided with an under cowl 245 configured to mainly cover a front-lower side of the engine unit 11.

(Engine Unit)

Figure 2:
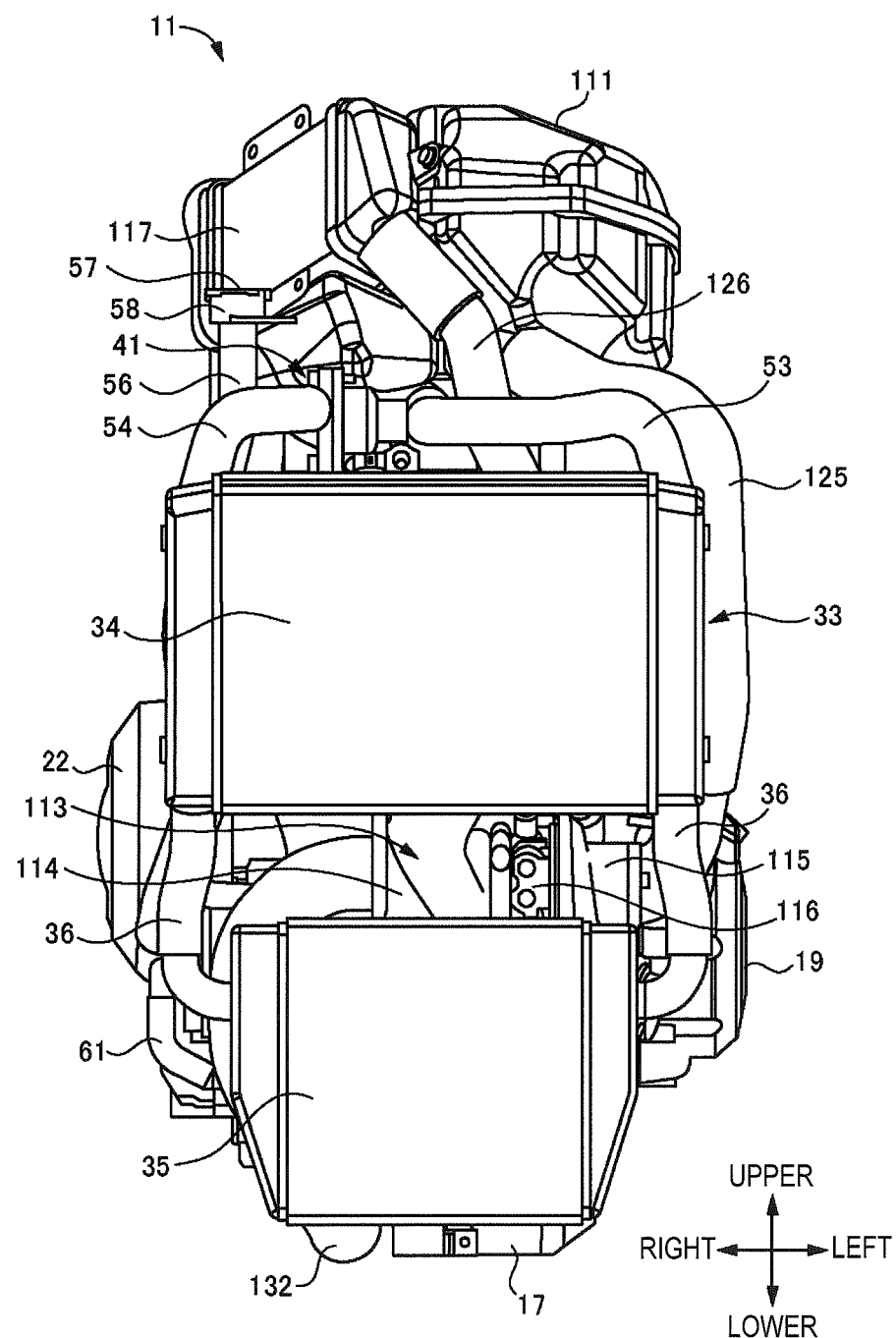
FIG. 2 is a front view of an engine unit of the motorcycle having a supercharger, which is the illustrative embodiment of the saddle-ridden type vehicle of the disclosure.
Figure 3:
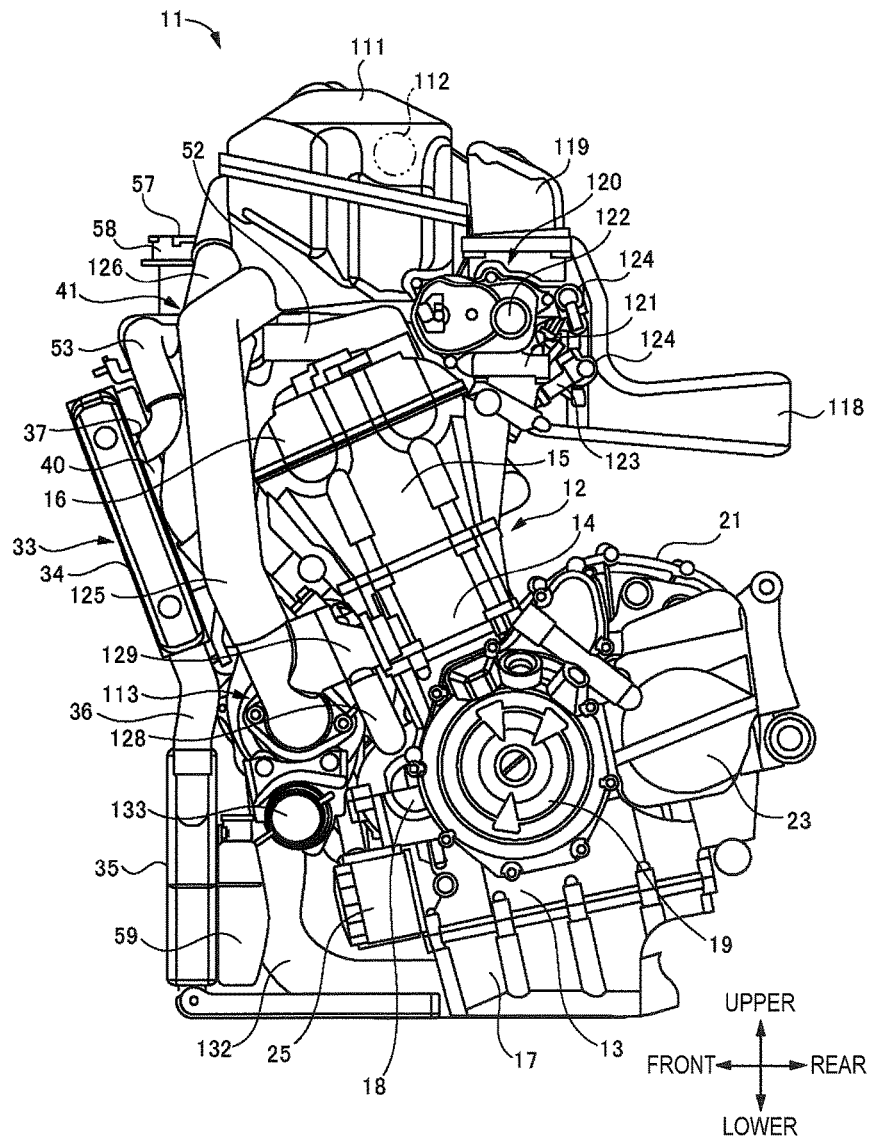
FIG. 3 is a left side view of the engine unit shown in FIG. 2.
Figure 4:
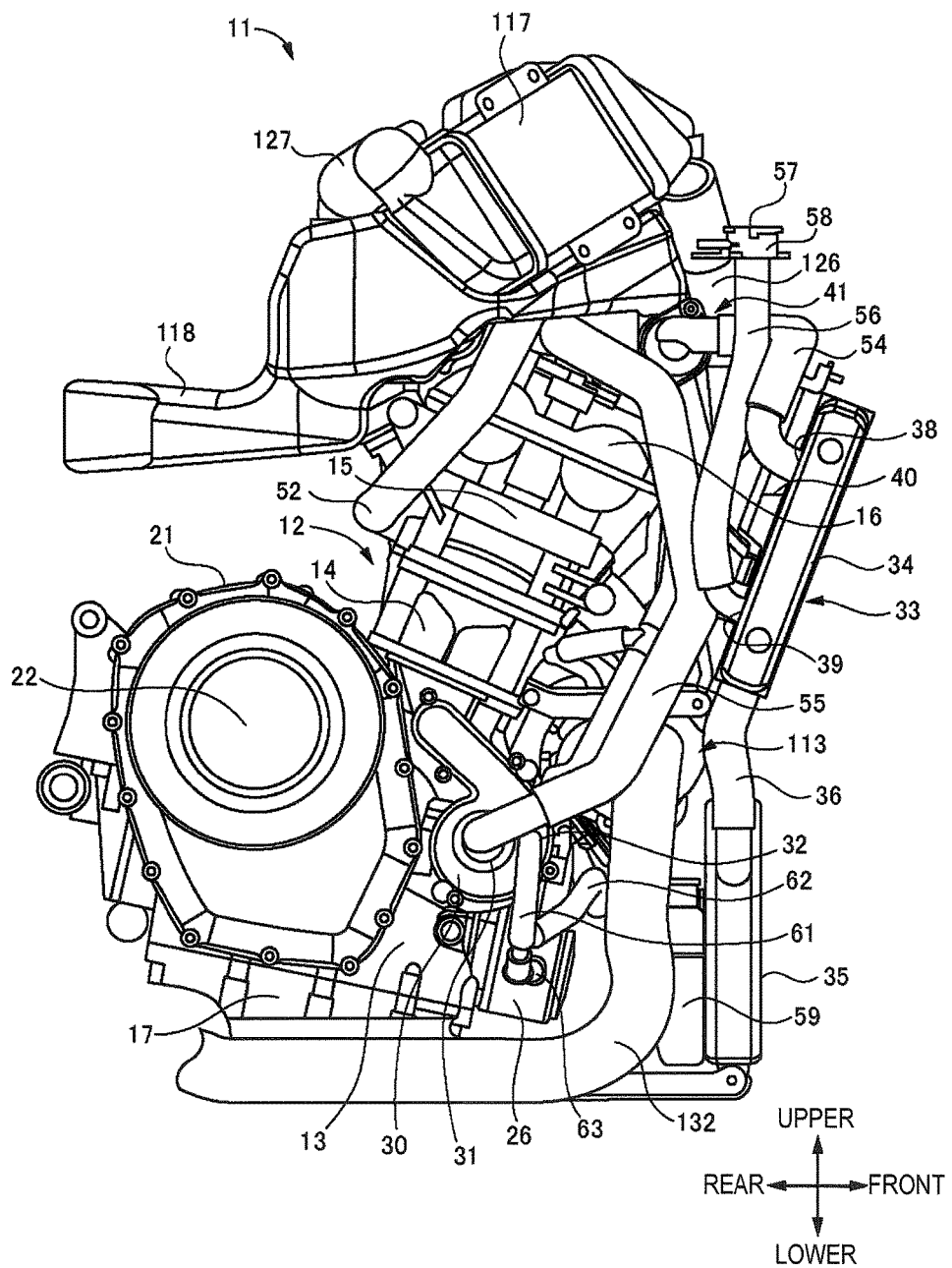
FIG. 4 is a right side view of the engine unit shown in FIG. 2.
Figure 5:
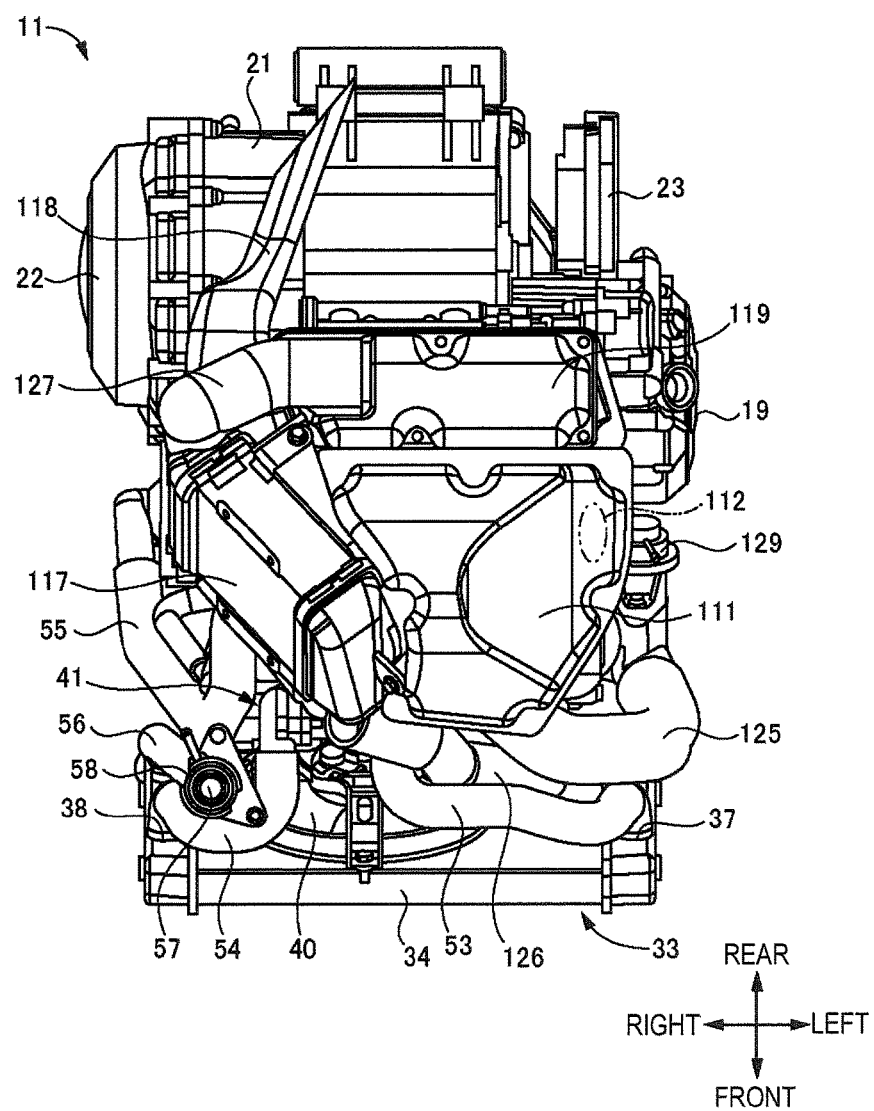
FIG. 5 is a plan view of the engine unit shown in FIG. 2.
Figure 6:
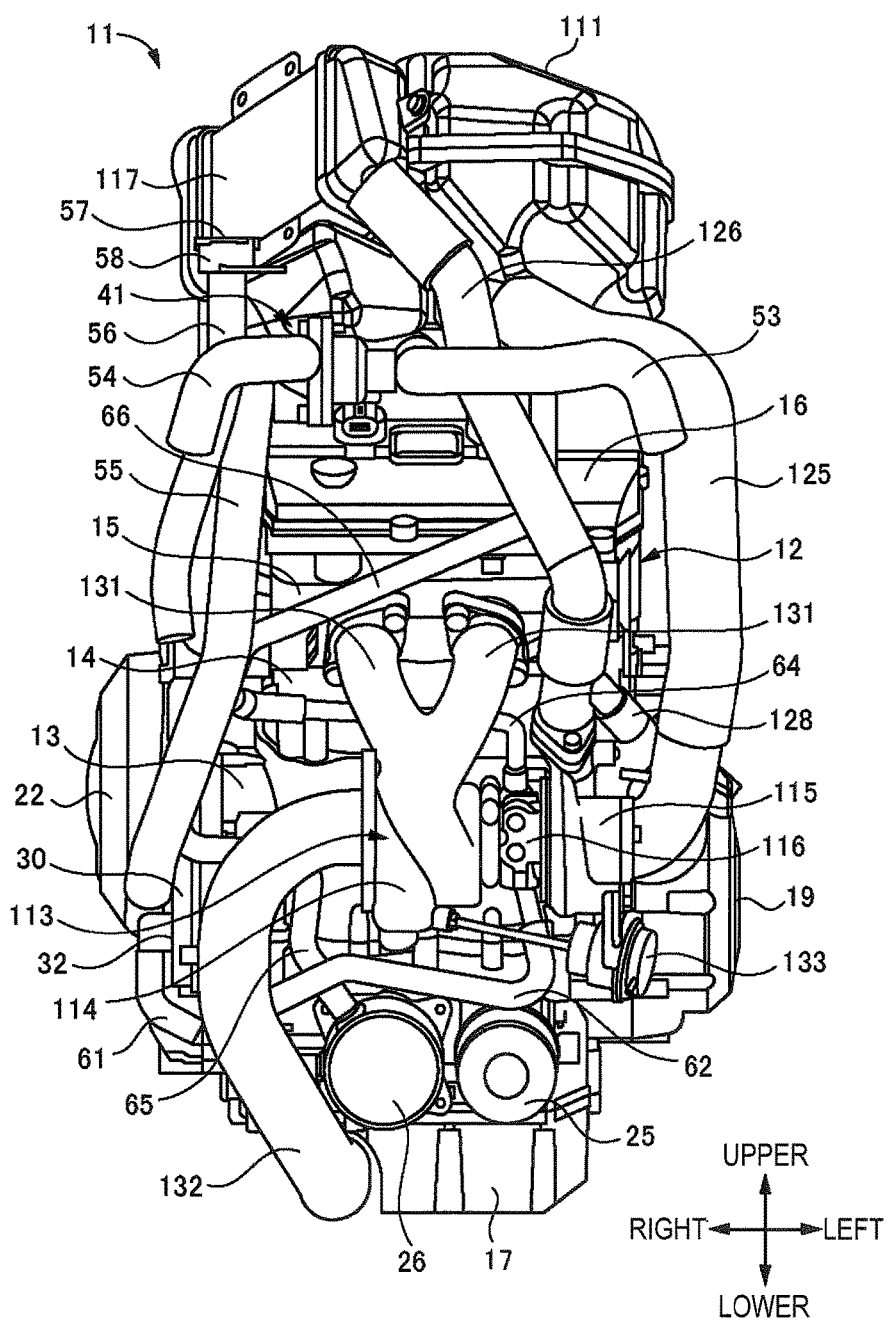
FIG. 6 is a front view depicting a state where a radiator has been removed from the engine unit shown in FIG. 2.
Figure 7:
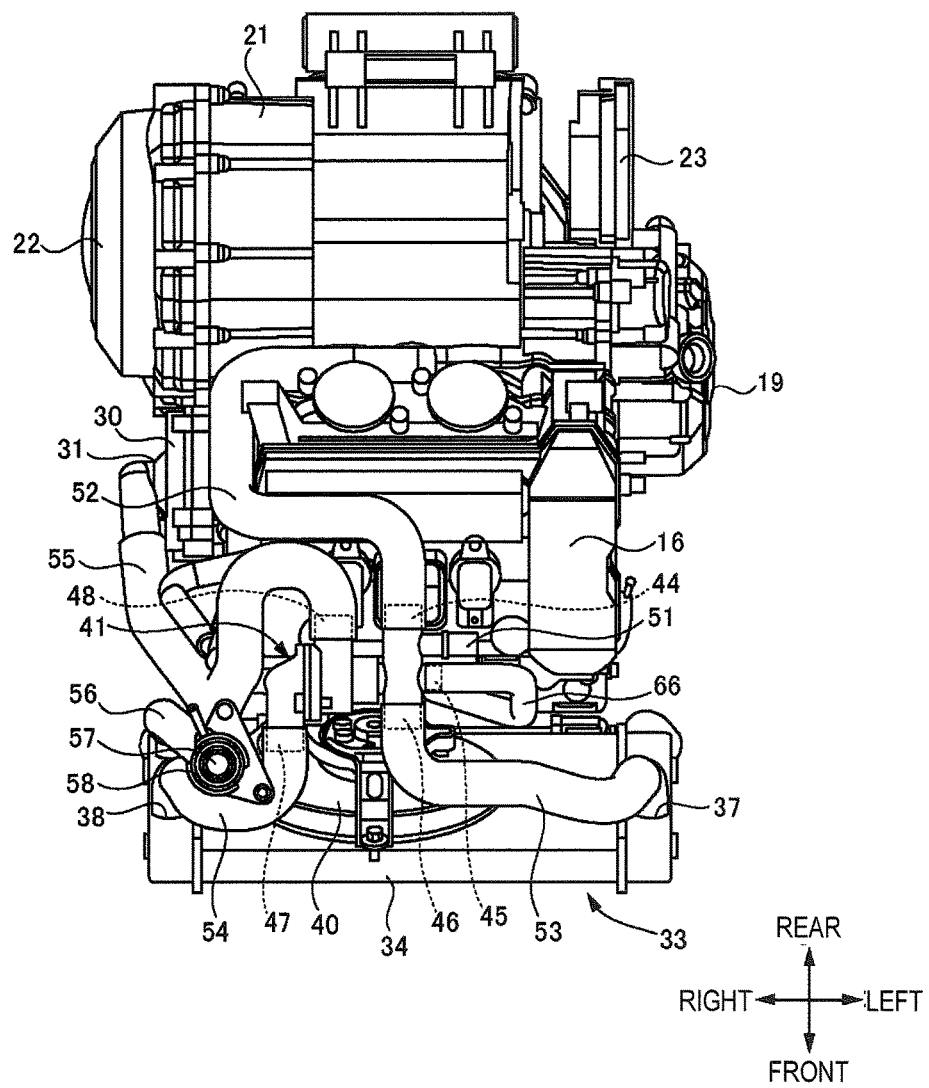
FIG. 7 is a plan view depicting a state where an air cleaner, an intercooler, a surge tank and the like have been removed from the engine unit shown in FIG. 2.

FIGS. 2 to 5 are a front view, a left side view, a right side view and a plan view of the engine unit 11, and FIG. 6 is a front view depicting a state where a radiator 33 has been removed from the engine unit 11. FIG. 7 is a plan view depicting a state where an air cleaner 111, an intercooler 117 and a surge tank 119 have been removed from the engine unit 11. As shown in FIG. 3, the engine unit 11 has an engine 12, parts of a driving system configured to transmit power of the engine 12 to the rear wheel 233, such as a primary deceleration mechanism, a clutch, a transmission and the like, a lubrication system configured to lubricate a moveable part of the engine 12, an intake system (including a supercharger 113) configured to supply a fuel-air mixture of air and fuel to the engine 12, parts of an exhaust system configured to discharge an exhaust gas, which is to be generated as the fuel-air mixture is combusted, from the engine 12, a cooling system configured to cool the engine 12 and the like, an AC generator configured to generate power by using rotation of a crankshaft, and the like.

As shown in FIG. 3, in the illustrative embodiment, the engine 12 is a water-cooling type parallel two-cylinder four-cycle gasoline engine, for example. The engine 12 has a crank case 13 configured to accommodate therein a crankshaft, a cylinder 14 provided above the crank case 13, a cylinder head 15 provided above the cylinder 14 and a cylinder head cover 16 provided above the cylinder head 15. Also, an oil pan 17 is provided below the crank case 13. A cylinder axis of the engine 12 is inclined so that an upper side is located at a forward position relative to a lower side. The engine 12 is provided with a balance shaft configured to reduce vibrations, which are to be generated by movement of a piston. The balance shaft is disposed in front of the crankshaft. Specifically, a balancer chamber 18 is integrally formed at a front part of the crank case 13 of the engine 12. The balancer chamber 18 is formed by expanding forward a part of the crank case 13. A front part of the balancer chamber 18 protrudes forward from a front wall part of the crank case 13. The balance shaft is provided in the balancer chamber 18. A left part of the crank case 13 is provided with a magneto chamber 19, and the AC generator is accommodated in the magneto chamber 19.

Also, as shown in FIG. 4, parts of the driving system of the engine unit 11, such as the primary deceleration mechanism, the clutch, the transmission and the like are disposed at the rear part of the engine 12. That is, a transmission case 21 is integrally formed at rear sides of the crank case 13 and the cylinder 14, and the primary deceleration mechanism and the transmission are accommodated in the transmission case 21. Also, a clutch cover 22 is attached to a right part of the transmission case 21, and the clutch disposed at the right of the transmission is covered by the clutch cover 22. Also, as shown in FIG. 3, a sprocket cover 23 is provided at a left part of the transmission case 21, and a drive sprocket disposed at a left side of the transmission is covered by the sprocket cover 23. Also, the drive sprocket is wound with a chain 235 configured to transmit the power of the engine 12 to the rear wheel 233, as shown in FIG. 1.

Also, as shown in FIG. 6, the lubrication system has an oil pump configured to pump engine oil stored in the oil pan 17 of the engine 12 and to supply the same to the respective parts of the engine 12, an oil filter 25 configured to filter the engine oil and a water-cooling type oil cooler 26 configured to cool the engine oil. The oil filter 25 and the oil cooler 26 are attached to a front-lower side of the engine 12.

Also, as shown in FIG. 3 or 6, the intake system has an air cleaner 111, a supercharger 113, an intercooler 117, an air discharging duct 118, a surge tank 119, an electronic control throttle device 120 and an injector 123. The air cleaner 111 is a device configured to filter air introduced from an outside, and has therein an air filter. The supercharger 113 is a device having a turbine unit 114, a compressor unit 115 and a bearing unit 116 and configured to drive the turbine unit 114 by the exhaust gas from the engine 12, to drive the compressor unit 115 by the driving and to compress the air supplied through the air cleaner 111 by the compressor unit 115. In the meantime, the bearing unit 116 is a part configured to accommodate therein a bearing configured to rotatably support a turbine wheel provided in the turbine unit 114 and a compressor impeller provided in the compressor unit 115. The intercooler 117 is a device configured to cool the air of which temperature has increased resulting from the compression by the compressor unit 115 of the supercharger 113. As shown in FIG. 5, the air discharging duct 118 configured to discharge cooling wind having collided with the intercooler 117 to the outside is provided in the vicinity of the intercooler 117. The surge tank 119 is a device configured to rectify the flow of the air cooled by the intercooler 117. The electronic control throttle device 120 shown in FIG. 3 is a device configured to regulate an amount of the air, which is to pass through the intercooler 117 and is to be supplied to an intake port of the engine 12. The electronic control throttle device 120 has a throttle body 121, a throttle valve provided in the throttle body 121 and configured to open and close an intake passage formed in the throttle body 121, and a driving motor 122 configured to drive the throttle valve. The injector 123 is a device configured to inject the fuel to the intake port of the engine 12. To the injector 123, a delivery pipe 124 configured to supply the fuel from the fuel tank 241 to the injector 123 is connected.

The respective parts configuring the intake system are disposed and connected as follows. That is, as shown in FIG. 6, the air cleaner 111 is disposed at an upper-left side of the engine 12. The supercharger 113 is disposed at the front of the engine 12, specifically, at the front of the cylinder 14 and the cylinder head 15. The air cleaner 111 and the compressor unit 115 of the supercharger 113 are connected therebetween by an air intake pipe 125, and the air intake pipe 125 is disposed at a front-left side of the engine 12. Also, the intercooler 117 is disposed at an upper-right side of the engine 12. The compressor unit 115 of the supercharger 113 and the intercooler 117 are connected therebetween by an air outlet pipe 126, and the air outlet pipe 126 is disposed at a front-left side of the engine 12 and at a right side of the air intake pipe 125. Also, as shown in FIG. 5, the surge tank 119 is disposed at an upper-rear side of the engine 12. The intercooler 117 and the surge tank 119 are connected therebetween by a connecting pipe 127. The connecting pipe 127 is disposed at a right-rear side above the engine 12. Also, as shown in FIG. 3, the throttle body 121 of the electronic control throttle device 120 is disposed between the surge tank 119 and the intake port of the engine 12 at a rear-upper side of the engine 12.

The air introduced from the outside normally sequentially passes through the air cleaner 111, the air intake pipe 125, the compressor unit 115 of the supercharger 113, the air outlet pipe 126, the intercooler 117, the connecting pipe 127, the surge tank 119 and the throttle body 121 of the electronic control throttle device 120, and is then supplied to the intake port of the engine 12.

Also, as shown in FIG. 3, an air bypass passage 128 configured to connect the air intake pipe 125 and the air outlet pipe 126 without interposing the compressor unit 115 of the supercharger 113 is provided in the vicinity of the compressor unit 115 of the supercharger 113, and an air bypass valve 129 configured to switch communication and cutoff of the air bypass passage 128 is provided on the way of the air bypass passage 128.

Meanwhile, in FIG. 3 or 5, an intake port 112 of the air cleaner 111 is pictorially shown with a dashed-two dotted line. However, the position of the intake port 112 can be appropriately set. Also, the intake port 112 is provided with an air duct configured to guide the exterior air to the intake port 112. However, the air duct is not shown.

Also, as shown in FIG. 6, the exhaust system has exhaust pipes 131 configured to connect exhaust ports of the engine 12 and the turbine unit 114 of the supercharger 113 therebetween, a muffler joint pipe 132 configured to connect the turbine unit 114 of the supercharger 113 and a muffler-side, a muffler (not shown), and the like. The exhaust pipes 131 configure a part of the engine unit 11. The exhaust pipes 131 are disposed at the front of the engine 12 and between the exhaust ports and the turbine unit 114 of the supercharger 113. In the illustrative embodiment, the exhaust pipes 131 are integrally formed with a housing of the turbine unit 114 of the supercharger 113. Specifically, one end-sides of the two exhaust pipes 131 are respectively connected to the two exhaust ports of the parallel two-cylinder engine 12. The other end-sides of the exhaust pipes 131 are coupled to each other to form one. The other end portion of the exhaust pipes 131 integrated into one is integrated with the housing of the turbine unit 114 of the supercharger 113. On the other hand, the exhaust pipe 131 and the housing of the turbine unit 114 may be formed as separate members and both members may be connected. Meanwhile, the muffler joint pipe 132 has one end-side connected to the turbine unit 114 of the supercharger 113 and the other end-side passing a lower-right side of the engine 12 and extending rearward toward the muffler. Also, the muffler is disposed at a rear-lower side of the engine 12. The exhaust gas discharged from the respective exhaust ports is supplied into the housing of the turbine unit 114 of the supercharger 113 via the exhaust pipes 131. By the exhaust gas, the turbine wheel of the turbine unit 114 is rotated. Subsequently, the exhaust gas discharged from the turbine unit 114 is supplied to the muffler via the muffler joint pipe 132 and is discharged from the muffler to the outside.

Also, the turbine unit 114 of the supercharger 113 is provided with a waste gate valve 133. That is, the turbine unit 114 is provided therein with a gate configured to circulate a part of the exhaust gas supplied via the exhaust pipes 131 toward the muffler joint pipe 132 without supplying the same to the turbine wheel-side. The waste gate valve 133 is configured to regulate an inflow amount of the exhaust gas to the turbine wheel-side by opening and closing the gate.

(Structure and Operation of Cooling System)

Also, as shown in FIG. 4 or 7, the cooling system has a water pump 30, a water jacket, a radiator 33 and a cooling water flow control unit 41. In the meantime, the water jacket is not shown.

The water pump 30 is a device configured to operate by using the rotation of the crankshaft and to supply the cooling water to the water jacket.

The water jacket is a mechanism provided in the cylinder 14 and the cylinder head 15 and configured to cool the cylinder 14 and the cylinder head 15 by the cooling water.

The radiator 33 is a device configured to receive traveling wind or to drive a radiator fan 40, thereby radiating the heat of the cooling water to the atmosphere to cool the cooling water. The radiator 33 is disposed at the front of the engine 12. Also, the radiator 33 is a so-called transvers flow type radiator, and is configured to cool the cooling water by flowing the cooling water in a right-left direction (in the illustrative embodiment, from left to right) in the radiator 33. Also, as shown in FIG. 2, the radiator 33 has an upper radiator 34 and a lower radiator 35. The upper radiator 34 and the lower radiator 35 are connected to each other via a pair of connecting hoses 36. As shown in FIG. 7, a part of the cooling water delivered from the cooling water flow control unit 41 and introduced into a radiator inlet 37 provided at a left-upper side of a rear surface of the upper radiator 34 is cooled by the upper radiator 34, and then returns to the cooling water flow control unit 41 from a radiator outlet 38 provided at a right-upper side of the rear surface of the upper radiator 34. Also, the remaining of the cooling water introduced into the radiator inlet 37 of the upper radiator 34 is supplied to the lower radiator 35 through one connecting hose 36 and is cooled by the lower radiator 35, which then sequentially passes through the other connecting hose 36 and the radiator outlet 38 of the upper radiator 34 and returns to the cooling water flow control unit 41. Also, the radiator fan 40 is attached to the rear surface of the upper radiator 34.

The cooling water flow control unit 41 has functions of regulating an amount of the cooling water to flow in the radiator 33 in accordance with a temperature of the cooling water and maintaining the temperature of the cooling water to an appropriate temperature. That is, the engine unit 11 is formed with a first circulation path of the cooling water, which is to be discharged from the water pump 30, to flow in the water jacket and to return to the water pump 30 without flowing in the radiator 33, and a second circulation path of the cooling water, which is to be discharged from the water pump 30, to flow in the water jacket and the radiator 33 and to return to the water pump 30. The cooling water flow control unit 41 is configured to switch the first circulation path and the second circulation path in accordance with the temperature of the cooling water.

Figure 8:
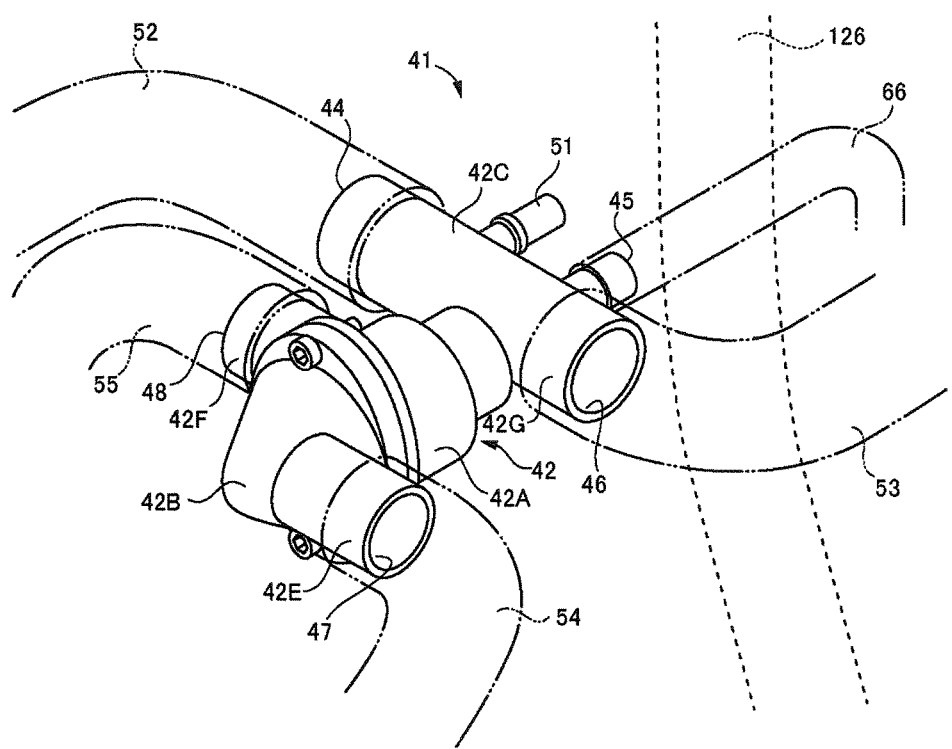
FIG. 8 illustrates a cooling water flow control unit of the motorcycle having a supercharger, which is the illustrative embodiment of the saddle-ridden type vehicle of the disclosure.
Figure 9:
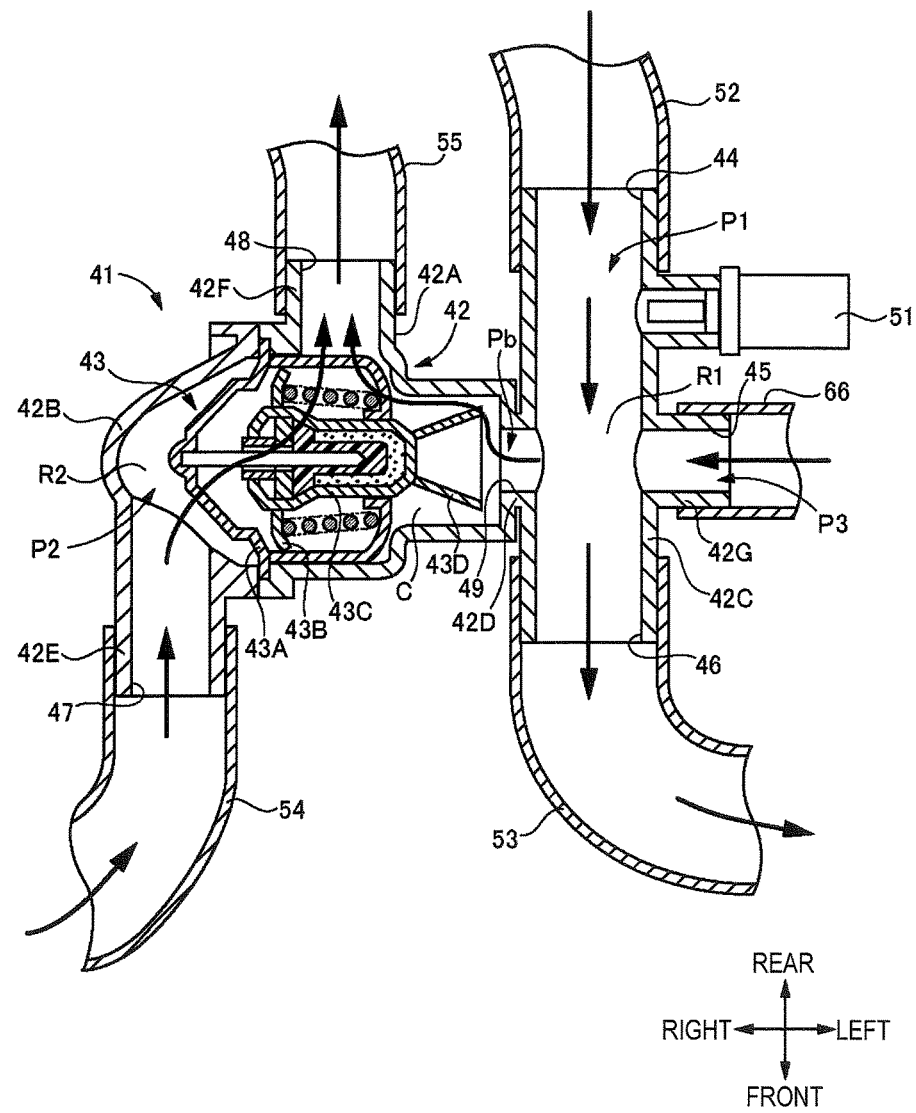
FIG. 9 illustrates an internal configuration and an operation of the cooling water flow control unit shown in FIG. 8.

FIG. 8 depicts an outward appearance of the cooling water flow control unit 41, and FIG. 9 depicts an inside of the cooling water flow control unit 41. As shown in FIG. 9, the cooling water flow control unit 41 has a thermostat housing 42 and a thermostat 43. The thermostat housing 42 is formed of a resin material or a metal material having heat resistance, for example. As shown in FIG. 8, the thermostat housing 42 has a cylindrical housing main body 42A, a cap part 42B fixed to a right side of the housing main body 42A by using a bolt or the like and configured to close the right side of the housing main body 42A, and a joint part 42C formed at a left side of the housing main body 42A. The joint part 42C has a cylindrical shape of which an axis line is perpendicular to an axis line of the housing main body 42A. Also, as shown in FIG. 9, the housing main body 42A and the joint part 42C are coupled via a coupling part 42D and are integrated. For example, the housing main body 42 and the joint part 42C are integrally formed by mold formation using a mold configured to have an integrated shape of the housing main body 42A and the joint part 42C. On the other hand, the housing main body 42 and the joint part 42C may be formed as separate members, and both members may be fitted and coupled.

Also, the thermostat housing 42 is formed with a first passage P1 into which the cooling water flowing out from the water jacket after cooling the engine 12 is to be introduced and which is configured to deliver the introduced cooling water to the radiator 33 and a second passage P2 into which the cooling water flowing out from the radiator 33 after being cooled by the radiator 33 is to be introduced and which is configured to return the introduced cooling water to the water pump 30.

That is, a left chamber R1 serving as a first chamber is formed in a left part of the thermostat housing 42, i.e., in the joint part 42C. A left-rear side of the thermostat housing 42 is formed with a first cooling water inlet 44 for introducing the cooling water, which flows out from the water jacket after cooling the engine 12, into the left chamber R1. Specifically, a rear opening of the joint part 42C is the first cooling water inlet 44. Also, a left-front side of the thermostat housing 42 is formed with a cooling water delivery port 46 for delivering the cooling water introduced into the left chamber R1 to the radiator 33. Specifically, a front opening of the joint part 42C is the cooling water delivery port 46. A passage configured by the first cooling water inlet 44, the left chamber R1 and the cooling water delivery port 46 is the first passage P1.

Also, a right chamber R2 serving as a second chamber is formed in a right part of the thermostat housing 42, i.e., in the housing main body 42A and the cap part 42B. Also, a right-front side of the thermostat housing 42 is formed with a cooling water return port 47 for introducing the cooling water, which flows out from the radiator 33 after being cooled by the radiator 33, into the right chamber R2. Specifically, a portion of a substantially conical peripheral wall part of the cap part 42B is formed with a tubular piping attachment part 42E protruding forward, and a front opening of the piping attachment part 42E is configured as the cooling water return port 47. Also, a right-rear side of the thermostat housing 42 is formed with a cooling water outlet 48 for returning the cooling water introduced into the right chamber R2 to the water pump 30. Specifically, a portion of a peripheral wall part of the housing main body 42A is formed with a tubular piping attachment part 42F protruding rearward, and a rear opening of the piping attachment part 42F is configured as the cooling water outlet 48. A passage configured by the cooling water return port 47, the right chamber R2 and the cooling water outlet 48 is the second passage P2.

Both the first passage P1 and the second passage P2 are integrally formed with the single thermostat housing 42 disposed above the engine 12, so that they are adjacent to each other.

Also, the first passage P1 and the second passage P2 are parallel with each other. That is, the joint part 42C extends straightly. For this reason, the first passage P1 extends straightly. Also, an extension direction (axial direction) of the piping attachment part 42E formed at the cap part 42B and an extension direction (axial direction) of the piping attachment part 42F formed at the housing main body 42A are parallel with each other and the piping attachment part 42E and the piping attachment part 42F are adjacent to each other. Therefore, it can be said that the second passage P2 also extends straightly, as seen from a substantial viewpoint. Also, an opening direction of the first cooling water inlet 44 and an opening direction of the cooling water outlet 48 are the same, and an opening direction of the cooling water delivery port 46 and an opening direction of the cooling water return port 47 are the same. For this reason, the extension direction of the first passage P1 and the extension direction of the second passage P2 are the same.

In the meantime, the thermostat housing 42 is formed with a third passage P3 for introducing the cooling water, which has flowed in the supercharger 113 or the oil cooler 26, into the first passage P1 so as to cool the supercharger 113 and the engine oil by the cooling water. Specifically, a left side of the left part of the thermostat housing 42 is formed with a second cooling water inlet 45 for introducing the cooling water, which has flowed in the oil cooler 26 or the supercharger 113, into the left chamber R1. Specifically, the peripheral wall part of the joint part 42C is formed with a tubular piping attachment part 42G protruding leftward, and a left opening of the piping attachment part 42G is configured as the second cooling water inlet 45. A passage ranging from the second cooling water inlet 45 to the left chamber R1 is the third passage P3.

Also, in the thermostat housing 42, a cooling water bypass passage Pb configured to communicate the first passage P1 and the second passage P2 each other is formed between the first passage P1 and the second passage P2. Specifically, a hole 49 configured to communicate the left chamber R1 and the right chamber R2 each other is formed in the coupling part 42D positioned between the left chamber R1 and the right chamber R2 in the thermostat housing 42. The hole 49 is the cooling water bypass passage Pb.

Also, the thermostat 43 is accommodated in the right chamber R2 of the thermostat housing 42. The thermostat 43 is configured to switch the first circulation path and the second circulation path in accordance with the temperature of the cooling water. Specifically, the thermostat 43 is configured to open and close the second passage P2 at a part (hereinafter, referred to as "upstream part of the second passage P2") of the second passage P2 positioned upstream of a connection part C between the second passage P2 and the cooling water bypass passage Pb in accordance with the temperature of the cooling water flowing in the right chamber R2. Also, the thermostat 43 is configured to open and close the cooling water bypass passage Pb in accordance with the temperature of the cooling water flowing in the right chamber R2.

As shown in FIG. 9, the thermostat 43 has a valve seat 43A, a main valve body 43B and a thermoelement 43C. The main valve body 43B is configured to open and close the upstream part of the second passage P2. The thermoelement 43C is configured to move the main valve body 43B relative to the valve seat 43A and to enable the main valve body 43B to be separated from or to be seated on the valve seat 43A in accordance with the temperature of the cooling water flowing in the right chamber R2. Specifically, the thermoelement 43C is configured to operate a spindle by using thermal expansion of wax enclosed in a pellet and to separate the main valve body 43B from the valve seat 43A against an urging force of a spring configured to urge the main valve body 43B in a direction of enabling the main valve body 43B to be seated on the valve seat 43A.

Also, the thermostat 43 is provided with a sub-valve body 43D. The sub-valve body 43D is configured to open and close the cooling water bypass passage Pb. Specifically, the sub-valve body 43D is fixed to a left part (a bottom part of the pellet) of the thermoelement 43C, and is configured to move together with the main valve body 43B in the same direction as the main valve body 43B. The sub-valve body 43D is configured to be separated from or to be seated on a part at which the cooling water bypass passage Pb opens toward the right chamber R2 of the thermostat housing 42.

Also, the thermostat 43 is disposed in the thermostat housing 42 so that a moving direction of the main valve body 43B relative to the valve seat 43A perpendicularly intersects with the first passage P1 and the second passage. Specifically, regarding the first passage P1 and the second passage P2 both of which extend in the front-rear direction, the thermostat 43 is disposed so that a part at which the valve seat 43A and the main valve body 43B are provided becomes a left side and a part at which the pellet of the thermoelement 43C is provided becomes a right side.

On the other hand, a water temperature sensor 51 configured to detect the temperature of the cooling water flowing in the first passage P1 is attached to the joint part 42C of the thermostat housing 42.

The respective parts configuring the cooling system are disposed and connected as follows. That is, as shown in FIG. 4, the water pump 30 is attached to the right side of the crank case 13. Also, the water pump 30 is disposed at a position corresponding to the balance shaft positioned in front of the crankshaft. Also, a path (not shown) along which the cooling water is to be supplied from the water pump 30 to the water jacket is formed between the water pump 30 and the water jacket. Also, as shown in FIG. 7, the cooling water flow control unit 41 is disposed above the cylinder head cover 16, specifically, at a right-front side above the cylinder head cover 16. In the meantime, although not shown, the cooling water flow control unit 41 is attached to a part (specifically, the main frame 213) of the vehicle body frame 211, for example.

Also, as shown in FIG. 7, the outlet-side of the water jacket and the first cooling water inlet 44 of the cooling water flow control unit 41 are connected therebetween by a cylinder outlet hose 52. Also, the cooling water delivery port 46 of the cooling water flow control unit 41 and the radiator inlet 37 of the upper radiator 34 are connected therebetween by a radiator inlet hose 53. Also, the radiator outlet 38 of the upper radiator 34 and the cooling water return port 47 of the cooling water flow control unit 41 are connected therebetween by a radiator outlet hose 54. Also, the cooling water outlet 48 of the cooling water flow control unit 41 and the cooling water intake port 31 of the water pump 30 are connected therebetween by a water pump inlet hose 55. The radiator inlet hose 53, the radiator outlet hose 54 and the water pump inlet hose 55 are concentrated at the front of the engine 12, i.e., in a space between the engine 12 and the radiator 33. Also, the cylinder outlet hose 52, the radiator outlet hose 54 and the water pump inlet hose 55 are concentrated in a right region around the engine 12.

Also, as shown in FIG. 4, a right-lower side of the rear surface of the upper radiator 34 is formed with a cooling water supply port 39, the cooling water supply port 39 is connected with a lower end portion of a water injection hose 56 extending in the upper-lower direction, and an upper end portion of the water injection hose 56 is provided with a cooling water injection part 58 having a cooling water injection port 57. Also, a reservoir tank 59 configured to reserve therein the cooling water is provided at the rear of the lower radiator 35, and the reservoir tank 59 is connected to the upper radiator 34 via an overflow pipe line (not shown), for example.

Also, the cooling system of the engine unit 11 has the configurations of supplying the cooling water to the oil cooler 26 and the supercharger 113, cooling the engine oil at the oil cooler 26 and cooling the bearing unit 116 of the supercharger 113. Specifically, as shown in FIG. 4, the water pump 30 has a cooling water discharge port 32 configured to supply the cooling water to the outside of the engine, in addition to a cooling water discharge port (not shown) configured to supply the cooling water to the water jacket. The cooling water discharge port 32 is connected with one end-side of a common inlet piping 61, and the other end-side of the common inlet piping 61 is connected with one end-side of a supercharger inlet piping 62 and one end-side of an oil cooler inlet piping 63 via a joint having one inlet and two outlets, respectively. Also, as shown in FIG. 6, the other end-side of the supercharger inlet piping 62 is connected to a cooling water inlet provided in the bearing unit 116 of the supercharger 113. Also, as shown in FIG. 4, the other end-side of the oil cooler inlet piping 63 is connected to a cooling water inlet provided in the oil cooler 26. Also, as shown in FIG. 6, a cooling water outlet provided in the bearing unit 116 of the supercharger 113 is connected with one end-side of a supercharger outlet piping 64, and a cooling water outlet provided in the oil cooler 26 is connected with one end-side of an oil cooler outlet piping 65. Also, the other end-side of the supercharger outlet piping 64 and the other end-side of the oil cooler outlet piping 65 are connected to one end-side of a common outlet piping 66 via a joint having two inlets and one outlet. Also, as shown in FIG. 7, the other end-side of the common outlet piping 66 is connected to the second cooling water inlet 45 of the cooling water flow control unit 41. The common inlet piping 61, the supercharger inlet piping 62, the oil cooler inlet piping 63, the supercharger outlet piping 64, the oil cooler outlet piping 65 and the common outlet piping 66 are concentrated at the front of the engine 12, i.e., in a space between the engine 12 and the radiator 33.

Figure 10:
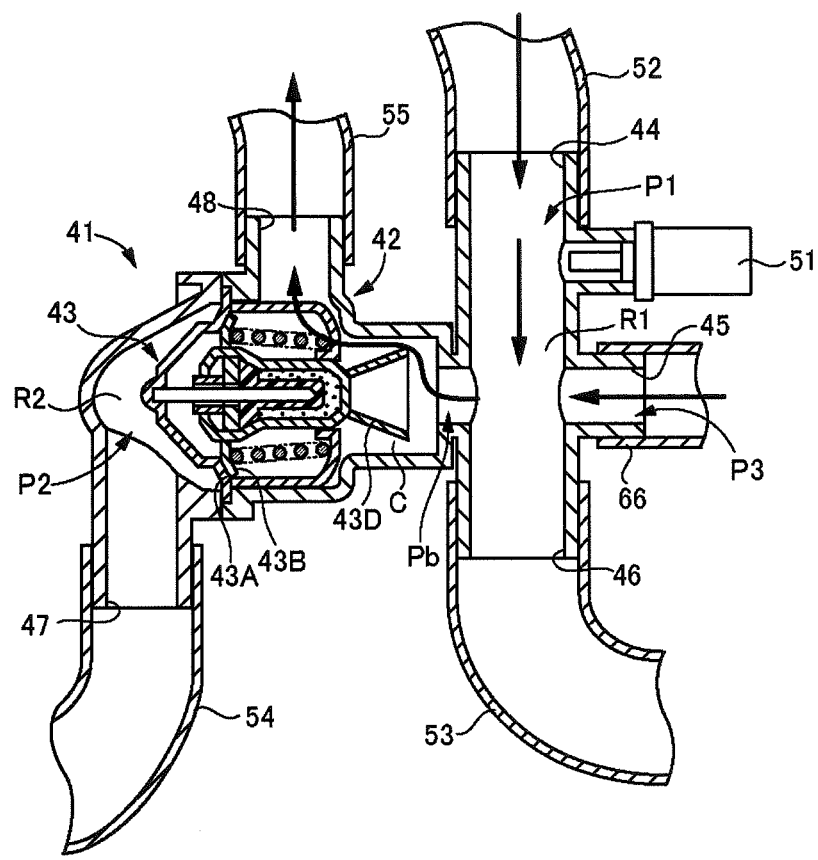
FIG. 10 illustrates the operation of the cooling water flow control unit shown in FIG. 8.

In the cooling system of the engine 12 having the above-described configuration, a flowing path of the cooling water in accordance with the temperature of the cooling water is described with reference to FIGS. 9 to 11. FIG. 10 depicts a flowing path of the cooling water when the temperature of the cooling water flowing in the right chamber R2 of the cooling water flow control unit 41 is equal to or lower than a predetermined reference temperature T1, FIG. 9 depicts a flowing path of the cooling water when the temperature of the cooling water flowing in the right chamber R2 is higher than the reference temperature T1 and is equal to or lower than a predetermined reference temperature T2 (T2>T1), and FIG. 11 depicts a flowing path of the cooling water when the temperature of the cooling water flowing in the right chamber R2 is higher than the reference temperature T2.

In FIG. 10, when the water pump 30 starts to drive as the engine 12 starts, the cooling water is supplied from the water pump 30 to the water jacket. The cooling water, which has flowed in the water jacket and has cooled the engine, is introduced into the left chamber R1 through the cylinder outlet hose 52 from the first cooling water inlet 44 of the cooling water flow control unit 41 and is also introduced into the right chamber R2 through the cooling water bypass passage Pb. The thermostat 43 completely closes the upstream part of the second passage P2 and completely opens the cooling water bypass passage Pb when the temperature of the cooling water flowing in the right chamber R2 is equal to or lower than the reference temperature T1. Thereby, the cooling water introduced into the left chamber R1 from the first cooling water inlet 44 sequentially flows in the cooling water bypass passage Pb, the right chamber R2 and the cooling water outlet 48 from the left chamber R1, and returns to the water pump 30 through the water pump inlet hose 55. At this time, since the cooling water does not flow in the radiator 33 (the cooling water having flowed out from the radiator outlet 38 does not flow in the second passage P2), the cooling water is not cooled by the radiator 33. The corresponding circulation path of the cooling water is formed upon a warm-up operation of the engine 12, for example. In this way, only the cooling water not cooled by the radiator 33 is enabled to circulate, so that it is possible to warm the engine 12 in a short time upon the warm-up operation.

In the meantime, as shown in FIG. 9, when the temperature of the cooling water flowing in the right chamber R2 is higher than the reference temperature T1 and is equal to or lower than the reference temperature T2, the thermostat 43 opens both the upstream part of the second passage P2 and the cooling water bypass passage Pb. Then, the thermostat 43 increases a flow path area of the upstream part of the second passage P2 and reduces a flow path area of the cooling water bypass passage Pb as the temperature of the cooling water flowing in the right chamber R2 increases. Thereby, the cooling water introduced into the left chamber R1 from the first cooling water inlet 44 is split in the left chamber R1 into the cooling water to flow in the cooling water bypass passage Pb and to be introduced into the right chamber R2 and the cooling water to sequentially flow in the cooling water delivery port 46, the radiator inlet hose 53, the radiator 33, the radiator outlet hose 54 and the cooling water return port 47 and to be introduced into the right chamber R2. The cooling water having flowed in the radiator 33 is cooled by the radiator 33. Also, the cooling waters having flowed in the two paths converge at the right chamber R2, which then returns from the cooling water outlet 48 to the water pump 30 through the water pump inlet hose 55. Also, in this case, as the temperature of the cooling water flowing in the right chamber R2 increases, an amount of the cooling water flowing in the radiator 33 relative to an amount of the cooling water flowing in the cooling water bypass passage Pb increases. In this way, the mixed cooling water of the cooling water not cooled at the radiator 33 and the cooling water cooled at the radiator 33 is enabled to circulate, so that it is possible to suppress a rapid change in the temperature of the cooling water and to stabilize the cooling of the engine 12.

Figure 11:
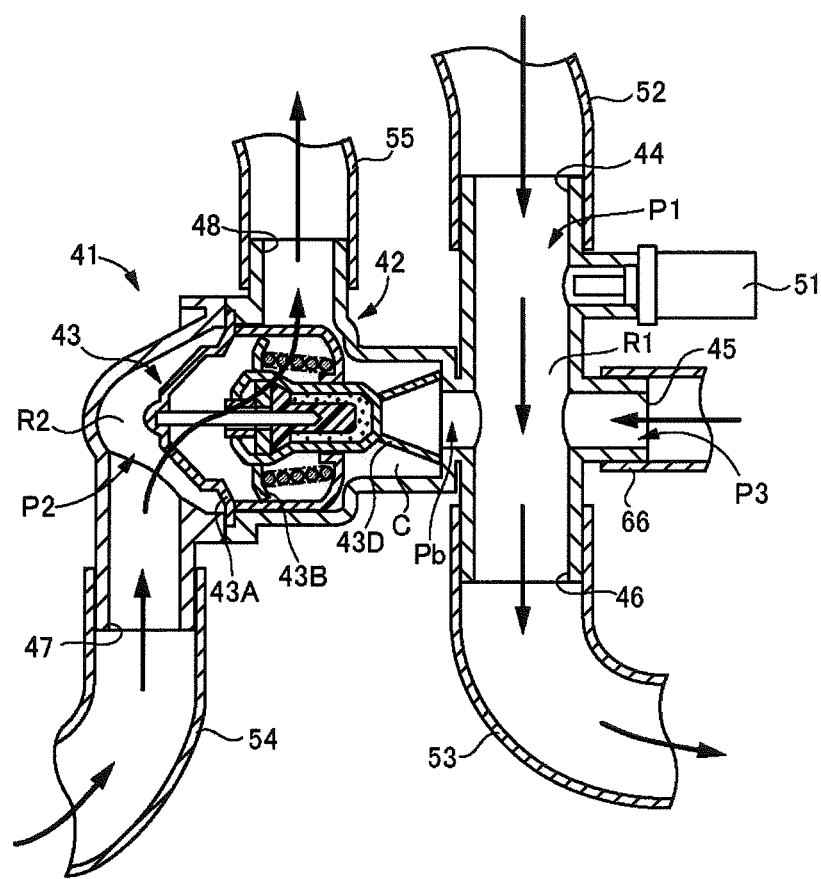
FIG. 11 illustrates the operation of the cooling water flow control unit shown in FIG. 8.

On the other hand, as shown in FIG. 11, when the temperature of the cooling water flowing in the right chamber R2 is higher than the reference temperature T2, the thermostat 43 completely opens the upstream part of the second passage P2 and completely closes the cooling water bypass passage Pb. Thereby, the cooling water introduced into the left chamber R1 from the first cooling water inlet 44 sequentially flows in the cooling water delivery port 46, the radiator inlet hose 53, the radiator 33, the radiator outlet hose 54, the cooling water return port 47, the right chamber R2 and the cooling water outlet 48 from the left chamber R1, and returns to the water pump 30 through the water pump inlet hose 55. When the engine 12 and the cooling water become at high temperatures, the corresponding circulation path of the cooling water is formed. In this way, only the cooling water cooled by the radiator 33 is enabled to circulate, so that it is possible to rapidly lower the temperature of the engine 12.

Also, as the water pump 30 is driven, the cooling water is supplied from the cooling water discharge port 32 of the water pump 30 to the supercharger 113 and the oil cooler 26 through the common inlet piping 61, the supercharger inlet piping 62 and the oil cooler inlet piping 63, respectively. The cooling water having cooled the supercharger 113 and the engine oil is introduced into the left chamber R1 from the second cooling water inlet 45 of the cooling water flow control unit 41 via the supercharger outlet piping 64, the oil cooler outlet piping 65 and the common outlet piping 66 from the supercharger 113 and the oil cooler 26, and converges with the cooling water introduced into the left chamber R1 through the first cooling water inlet 44 from the water jacket.

As described above, according to the motorcycle 1, which is an illustrative embodiment of the saddle-ridden type vehicle of the disclosure, all of the cylinder outlet hose 52, the radiator inlet hose 53, the radiator outlet hose 54 and the water pump inlet hose 55 are connected by the single cooling water flow control unit 41, so that the four hoses are concentrated about the cooling water flow control unit 41. Also, since the first passage P1 and the second passage P2 are adjacent to each other in the cooling water flow control unit 41, the cylinder outlet hose 52 and radiator inlet hose 53 connected to the first passage P1 and the radiator outlet hose 54 and water pump inlet hose 55 connected to the second passage P2 are disposed close to each other. Thereby, it is possible to increase a degree of the concentrated arrangement of the four hoses. Also, the first passage P1 and the second passage P2 are made to be parallel with each other, so that it is possible to further increase the degree of the concentrated arrangement of the four hoses.

Specifically, in the illustrative embodiment, as shown in FIG. 6 or 7, since the cooling water flow control unit 41 is disposed at the right-front side above the cylinder head cover 16 of the engine 12, it is possible to bring the cylinder outlet hose 52 close to the right side of the engine 12 and to concentrate the radiator inlet hose 53, the radiator outlet hose 54 and the water pump inlet hose 55 at the front of the right side of the engine 12. As a result, a large empty space is formed at the left of the engine 12, so that it is possible to freely or easily dispose the components of the lubrication system, the intake system and the exhaust system by using the empty space. Thereby, it is possible to dispose the respective components at appropriate positions around the engine 12, so that it is possible to increase the mounting ability of the respective components upon the manufacturing or to miniaturize the engine unit 11. Also, it is possible to conceal the radiator inlet hose 53, the radiator outlet hose 54 and the water pump inlet hose 55, which are concentrated at the front of the right side of the engine 12, in the cowl, thereby improving the outward appearance of the motorcycle 1.

In particular, it is possible to easily secure the places, at which the components, i.e., the supercharger 113, the air intake pipe 125, the air outlet pipe 126, the air bypass passage 128, the air bypass valve 129 and the like, which are required as the motorcycle 1 is provided with the supercharger 113, are to be disposed, at the left side of the engine 12. Therefore, even though the number of components increases as the supercharger 113 is added, it is possible to efficiently dispose the components around the engine 12, so that it is possible to miniaturize the engine unit 11 and the motorcycle 1 having the supercharger.

Also, the cooling water bypass passage Pb is formed in the cooling water flow control unit 41, so that a piping for forming the cooling water bypass passage is not required. Therefore, it is possible to expand a space in which the components of the lubrication system, the intake system and the exhaust system are to be disposed, to save the manufacturing cost as the number of components is reduced, and to lighten the vehicle. Also, the cooling water bypass passage Pb is formed in the cooling water flow control unit 41 and the cooling water bypass passage Pb is shortened, so that it is possible to reduce a pressure loss of the cooling water flowing in the first circulation path.

Also, the thermostat 43 is disposed in the thermostat housing 42 so that the moving direction of the main valve body 43B of the thermostat 43 relative to the valve seat 43A perpendicularly intersects with the first passage P1 and the second passage P2. Thereby, it is possible to miniaturize the cooling water flow control unit 41 and to easily form the configuration of opening and closing the upstream part of the second passage P2 in accordance with the temperature of the cooling water flowing in the right chamber R2.

Also, in the illustrative embodiment, the common outlet piping 66, in which the cooling water having flowed in the supercharger 113 and the oil cooler 26 flows, is connected to the second cooling water inlet 45 of the cooling water flow control unit 41. Thereby, the cooling water to flow in the supercharger 113 and the oil cooler 26 and the cooling water to cool the engine are made to converge by the cooling water flow control unit 41. By this configuration, it is possible to concentrate not only the cylinder outlet hose 52, the radiator inlet hose 53, the radiator outlet hose 54 and the water pump inlet hose 55 forming the circulation path of the cooling water to cool the engine but also the pipings forming the circulation path of the cooling water to cool the supercharger 113 and the engine oil, so that it is possible to further expand the space in which the components of the lubrication system, the intake system and the exhaust system are to be disposed.

Also, in the illustrative embodiment, as shown in FIG. 6, the supercharger 113 (the compressor unit 115) is disposed at the front-left side of the engine 12, the intercooler 117 is disposed above the engine 12, and the air outlet pipe 126 configured to connect the supercharger 113 and the intercooler 117 is disposed toward the left side of the front of the engine 12. In the meantime, the cooling water flow control unit 41 is disposed at the right side above the engine 12 so that the first passage P1 is at the left and the second passage P2 is at the right. As shown in FIG. 8, the air outlet pipe 126 passes through the left of the first passage P1 of the cooling water flow control unit 41. As a result, the second passage P2 of the cooling water flow control unit 41 is spaced from the air outlet pipe 126, as compared to the first passage P1. Thereby, it is possible to lengthen a distance between the radiator outlet hose 54 and water pump inlet hose 55 connected to the second passage P2 and the air outlet pipe 126. Therefore, it is possible to suppress a situation where the heat of the air of which temperature has increased resulting from the compression by the supercharger 113 and which flows in the air outlet pipe 126 is transmitted to the cooling water cooled by the radiator 33 and flowing in the radiator outlet hose 54 and the water pump inlet hose 55. As a result, it is possible to suppress the cooled cooling water from being heated by the heat of the air. Therefore, it is possible to increase the cooling effect of the cooling water by the radiator 33 and to prevent the cooling effect of the cooling water from being deteriorated due to the addition of the supercharger 113.

Also, as shown in FIG. 6, since the supercharger 113 is disposed at the left side of the engine 12 and the cooling water flow control unit 41 is disposed at the right side above the engine 12 so that the first passage P1 is at the left side and the second passage P2 is at the right side, the second passage P2 can be spaced from the supercharger 113, as compared to the first passage P1. Therefore, it is possible to lengthen a distance between the radiator outlet hose 54 and water pump inlet hose 55 connected to the second passage P2 and the supercharger 113. Thereby, it is possible to prevent a situation where the cooling water cooled by the radiator 33 is heated due to the heat of the supercharger 113 and the cooling effect of the cooling water by the radiator 33 is thus lowered.

Also, as shown in FIG. 9, in the cooling water flow control unit 41, the thermostat 43 is provided with the sub-valve body 43D, and the cooling water bypass passage Pb is completely closed by the sub-valve body 43D when the temperature of the cooling water is higher than the reference temperature T2. Thereby, when the engine 12 reaches the high temperatures, only the cooling water cooled by the radiator 33 is enabled to flow in the water jacket and the like, so that it is possible to rapidly lower the temperature of the engine 12. Also, when the temperature of the cooling water is higher than the reference temperature T2, the cooling water bypass passage Pb is completely closed by the sub-valve body 43D. Therefore, even though a passage diameter of the cooling water bypass passage Pb is made large or a passage length is shortened, the cooling effect of the engine 12 is not lowered when the engine 12 reaches the high temperatures. For this reason, it is possible to reduce a passage resistance of the cooling water bypass passage by enlarging the passage diameter of the cooling water bypass passage Pb or shortening the passage length. Thereby, when the temperature of the cooling water is equal to or lower than the reference temperature T1 and the cooling water bypass passage Pb is completely opened, the cooling water not cooled by the radiator 33 can be made to smoothly circulate, so that it is possible to increase the warming-up performance of the engine 12.

Meanwhile, in the above illustrative embodiment, the thermostat 43 having the sub-valve body 43D is adopted, and the cooling water bypass passage Pb is opened and closed by the sub-valve body 43D in accordance with the temperature of the cooling water. However, the disclosure is not limited thereto. For example, a configuration where a thermostat having no sub-valve body is adopted and the cooling water bypass passage Pb is opened all the time may also be possible.

Figure 12:
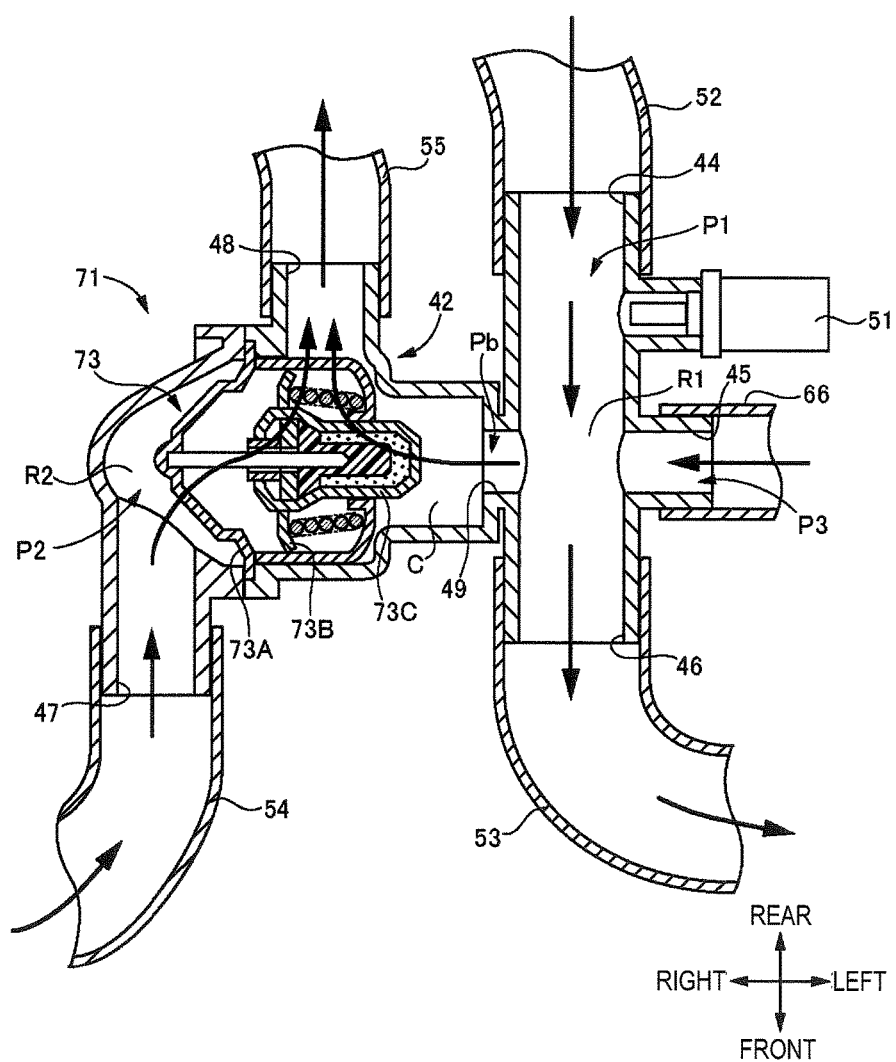
FIG. 12 illustrates another example of the cooling water flow control unit of the motorcycle having a supercharger, which is an illustrative embodiment of the saddle-ridden type vehicle of the disclosure.

Herein, FIG. 12 depicts a configuration where the cooling water bypass passage Pb is opened all the time. As shown in FIG. 12, the right chamber R2 of a cooling water flow control unit 71 is provided with a thermostat 73, and the thermostat 73 has a valve seat 73A, a valve body 73B and a thermoelement 73C. However, the thermostat 73 has no sub-valve body.

In the cooling water flow control unit 71, the valve body 73B of the thermostat 43 completely closes the upstream part of the second passage P2 when the temperature of the cooling water flowing in the right chamber R2 is equal to or lower than the reference temperature T1. At this time, the cooling water bypass passage Pb is at a completely opened state. As a result, the flowing path of the cooling water in the cooling water flow control unit 71 is the same as the flowing path of the cooling water in the cooling water flow control unit 41 shown in FIG. 10.

Also, when the temperature of the cooling water flowing in the right chamber R2 is higher than the reference temperature T1 and is equal to or lower than the reference temperature T2, the valve body 73B of the thermostat 43 opens the upstream part of the second passage P2, and increases the flow path area of the upstream part of the second passage P2 as the temperature of the cooling water flowing in the right chamber R2 increases. At this time, the cooling water bypass passage Pb is at the completely opened state all the time. As a result, although the flowing path of the cooling water in the cooling water flow control unit 71 is substantially the same as the flowing path of the cooling water in the cooling water flow control unit 41 shown in FIG. 9, since the cooling water bypass passage Pb cannot be narrowed in the cooling water flow control unit 71, the temperature of the cooling water is adjusted only by regulating a flow rate of the cooling water, which is to be introduced from the cooling water return port 47 into the right chamber R2 and is to flow out from the right chamber R2 to the cooling water outlet 48, i.e., an amount of the cooling water flowing in the radiator 33.

Also, when the temperature of the cooling water flowing in the right chamber R2 is higher than the reference temperature T2, the valve body 73B of the thermostat 43 completely opens the upstream part of the second passage P2. At this time, the cooling water bypass passage Pb is at the completely opened state. As a result, the flowing path of the cooling water in the cooling water flow control unit 71 is as shown in FIG. 12. That is, the cooling water introduced from the first cooling water inlet 44 into the left chamber R1 is split in the left chamber R1 into the cooling water, which is to flow in the cooling water bypass passage Pb and is to be introduced into the right chamber R2, and the cooling water, which is to sequentially flow in the cooling water delivery port 46, the radiator 33 and the cooling water return port 47 and is to be introduced into the right chamber R2, and then the cooling waters having flowed in the two paths converge at the right chamber R2, which then returns from the cooling water outlet 48 to the water pump 30. At this time, since the upstream part of the second passage P2 has been completely opened, a flow rate of the cooling water, which is to be introduced from the cooling water return port 47 into the right chamber R2 and is to flow out from the right chamber R2 into the cooling water outlet 48, i.e., an amount of the cooling water flowing in the radiator 33 is maximized. In the cooling water flow control unit 71 shown in FIG. 12, the mixed water of the cooling water cooled by the radiator 33 and the cooling water not cooled by the radiator 33 flows in the water jacket and the like even when the temperature of the cooling water is higher the reference temperature T2, unlike the cooling water flow control unit 41 shown in FIGS. 9 to 11. However, when the temperature of the cooling water is higher than the reference temperature T2, a ratio of the amount of the cooling water cooled by the radiator 33 to the amount of the cooling water not cooled by the radiator 33 becomes maximized.

In this way, it is possible to regulate the amount of the cooling water, which is enabled to circulate in the radiator 33 in accordance with the temperature of the cooling water, and to thus maintain the temperature of the cooling water to the appropriate temperature even by the cooling water flow control unit 71 having the thermostat 73 for which the sub-valve body is not provided. Also, according to the cooling water flow control unit 71, the thermostat 73 having no sub-valve body is adopted, so that it is possible to save the manufacturing cost and to simplify the structure of the cooling water flow control unit.

Also, in the above illustrative embodiment, the water pump 30 and the cooling water flow control unit 41 are disposed at the right side of the engine 12, and the supercharger 113 is disposed at the left side of the engine. However, the disclosure is not limited thereto. For example, the arrangements and directions of the water pump 30, the cooling water flow control unit 41 and the supercharger 113 may be reversed with respect to the right-left direction. In this case, the second passage P2 of the cooling water flow control unit 41 is positioned at the left of the first passage P1, and the air outlet pipe 126 passes the right of the first passage P1.

Also, the disclosure can be applied to a saddle-ridden type vehicle having no supercharger. Also, the engine of the saddle-ridden type vehicle of the disclosure is not limited to the parallel two-cylinder four-cycle gasoline engine as described in the illustrative embodiment. Also, the disclosure can be applied to a saddle-ridden type vehicle having a general unified radiator, which is not divided into an upper radiator and a lower radiator. Also, the saddle-ridden type vehicle of the disclosure is not limited to the motorcycle, and can be applied to a variety of saddle-ridden type vehicles such as a three-wheeled vehicle, a buggy car or the like having an engine.

Also, the disclosure can be appropriately changed without departing from the gist or spirit of the inventions that can be understood from the claims and the entire specification, and a saddle-ridden type vehicle having the change is also included in the technical spirit of the disclosure.

What is claimed is:

1. A saddle-ridden type vehicle comprising:
   an engine;
   a water pump configured to supply cooling water for cooling the engine to the engine;
   a radiator configured to cool the cooling water having cooled the engine; and
   a cooling water flow control unit configured to switch a first circulation path of the cooling water, which is to be discharged from the water pump, to flow in the engine and to return to the water pump without flowing in the radiator, and a second circulation path of the cooling water, which is to be discharged from the water pump, to flow in the engine and to return to the water pump while at least a part of the cooling water flows in the radiator, in accordance with a temperature of the cooling water,
   wherein the cooling water flow control unit comprises a thermostat and a thermostat housing configured to accommodate therein the thermostat,
   wherein the thermostat housing is formed with a first passage into which the cooling water flowing out from the engine after cooling the engine is to be introduced and which is configured to deliver the introduced cooling water to the radiator, a second passage into which the cooling water flowing out from the radiator after being cooled by the radiator is to be introduced and which is configured to return the introduced cooling water to the water pump, and a bypass passage configured to communicate the first passage and the second passage each other, the first passage and the second passage being disposed to be adjacent to each other, and
   wherein the thermostat is configured to switch communication and cutoff of the second passage at a part of the second passage, which is positioned upstream of a connection part between the second passage and the bypass passage, in accordance with the temperature of the cooling water.

2. The saddle-ridden type vehicle according to claim 1, wherein the first passage and the second passage are disposed in parallel with each other.

3. The saddle-ridden type vehicle according to claim 2, wherein the thermostat comprises a valve seat, a valve body and a thermoelement configured to move the valve body in a predetermined moving direction and to enable the valve body to be separated from or to be seated on the valve seat in accordance with the temperature of the cooling water, and
   wherein the thermostat is disposed in the thermostat housing so that the moving direction of the valve body perpendicularly intersects with the first passage and the second passage.

4. The saddle-ridden type vehicle according to claim 1, wherein one side of the thermostat housing is formed with, as the first passage, a first chamber, an inlet for introducing the cooling water having flowed out from the engine into the first chamber and a delivery port for delivering the cooling water introduced into the first chamber to the radiator,
   wherein the other side of the thermostat housing is formed with, as the second passage, a second chamber, a return port for introducing the cooling water having flowed out from the radiator into the second chamber and an outlet for returning the cooling water introduced into the second chamber to the water pump,
   wherein the thermostat housing is formed therein with, as the bypass passage, a hole for communicating the first chamber and the second chamber each other, and
   wherein the thermostat is disposed in the second chamber.

5. The saddle-ridden type vehicle according to claim 4, wherein in the thermostat housing, an opening direction of the inlet and an opening direction of the outlet are the same and an opening direction of the delivery port and an opening direction of the return port are the same.

6. The saddle-ridden type vehicle according to claim 1, wherein the thermostat housing is formed with a third passage for introducing the cooling water having flowed in a supercharger or an oil cooler attached to the engine into the first passage.

7. The saddle-ridden type vehicle according to claim 1, wherein when defining front, rear, right, left, upper and lower directions on the basis of a driver sitting on a seat of the saddle-ridden type vehicle, a supercharger is disposed at the front of the engine and at one side of the engine in a right-left direction, an intercooler is disposed above the engine, a piping configured to connect the supercharger and the intercooler and to guide air compressed by the supercharger to the intercooler is disposed at the front of the engine, the cooling water flow control unit is disposed above the engine, below the intercooler and at the other side of the engine in the right-left direction so that the first passage is at the one side in the right-left direction and the second passage is at the other side in the right-left direction, and the piping is configured to pass through one side of the cooling water flow control unit in the right-left direction.

8. The saddle-ridden type vehicle according to claim 7, wherein the second passage is located at a position spaced from the supercharger relative to the first passage.

* * * * *